ELAPSED TIME COMPUTER

Filed July 22, 1957 17 Sheets-Sheet 1

INVENTORS
Harold C. Robinson,
Robert B. Stevenson,
Arthur C. Aitken,
By George H. Simmons
atty INVENTORS.
Harold C. Robinson,
Robert B. Stevenson,
Arthur C. Aitken,
By George H. Simmons
Atty INVENTORS.
Harold C. Robinson,
Robert B. Stevenson,
Arthur C. Aitken,
By George H. Simmons
Atty INVENTORS
Harold C Robinson,
Robert B Stevenson,
Arthur C. Aitken,
By George H. Simmons
Atty INVENTORS.
Harold C. Robinson,
Robert B. Stevenson,
Arthur C. Aitken,
By George H. Simmons
Atty May 9, 1961 H. C. ROBINSON ET AL 2,983,443

ELAPSED TIME COMPUTER

Filed July 22, 1957 17 Sheets-Sheet 6

INVENTORS.
Harold C. Robinson,
Robert B. Stevenson,
Arthur C. Aitken,
By George H. Simmons
Atty

ELAPSED TIME COMPUTER

Filed July 22, 1957 17 Sheets-Sheet 7

INVENTORS
Harold C. Robinson,
Robert B. Stevenson,
Arthur C. Aitken,
By George H. Simmons
atty.

INVENTORS.
Harold C. Robinson,
Robert B. Stevenson,
Arthur C. Aitken,
By George H. Simmons
Atty May 9, 1961 H. C. ROBINSON ET AL 2,983,443

ELAPSED TIME COMPUTER

Filed July 22, 1957 17 Sheets-Sheet 9

INVENTORS
Harold C. Robinson,
Robert B. Stevenson,
Arthur C. Aitken,
By George H. Simmons Atty INVENTORS.
Harold C. Robinson,
Robert B. Stevenson,
Arthur C. Aitken,
By George H. Simmons
Atty

ELAPSED TIME COMPUTER

INVENTORS
Harold C Robinson,
Robert B. Stevenson,
Arthur C. Aitken,
By George H. Simmons Atty INVENTORS.
Harold C Robinson,
Robert B. Stevenson,
Arthur C. Aitken,
By George H. Simmons
Atty

ELAPSED TIME COMPUTER

INVENTORS.
Harold C. Robinson,
Robert B. Stevenson,
Arthur C. Aitken,
By George H. Simmons
Atty

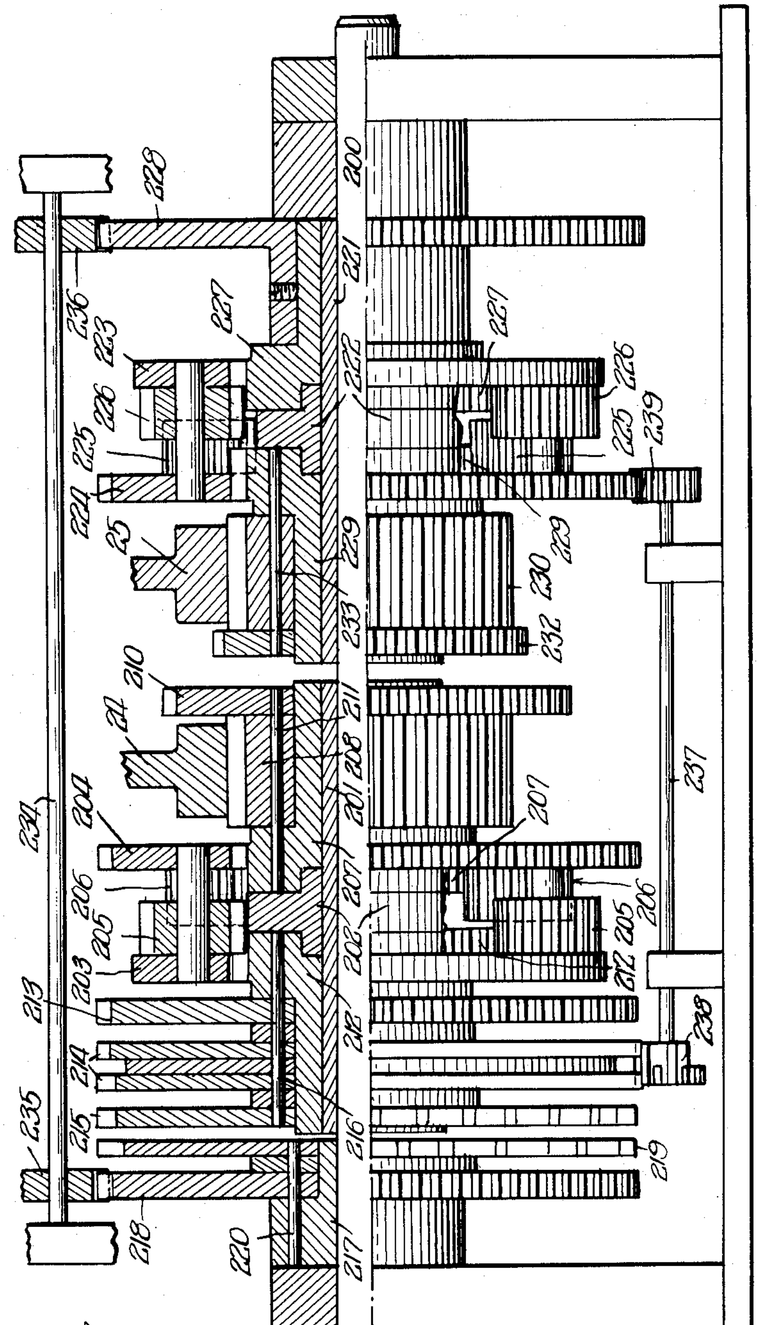
Fig. 17
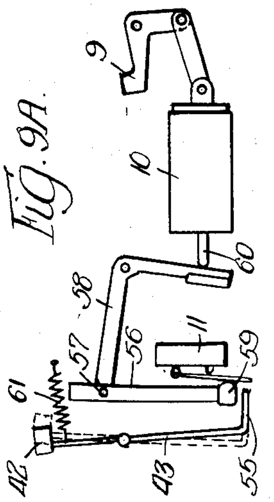
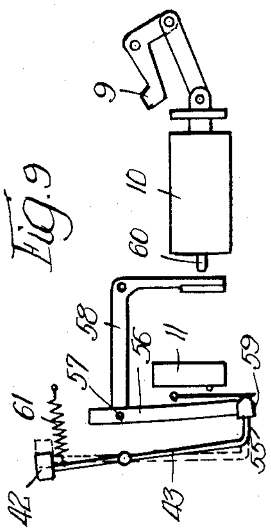
INVENTORS
Harold C. Robinson,
Robert B. Stevenson,
Arthur C. Aitken,
By George H. Simmons
Atty.

INVENTORS.
Harold C. Robinson,
Robert B. Stevenson,
Arthur C. Aitken,
By George H. Simmons
Atty.

INVENTOR.
Harold C Robinson,
Robert B. Stevenson,
Arthur C. Aitken,
By George H. Simmons Atty INVENTORS
Harold C. Robinson,
Robert B. Stevenson,
Arthur C. Aitken,
By George H. Simmons
atty United States Patent Office 2,983,443
Patented May 9, 1961

2,983,443

ELAPSED TIME COMPUTER

Harold C. Robinson and Arthur C. Aitken, Towson, Md., and Robert B. Stevenson, Hollywood, Fla., assignors to The Shaw-Walker Co., Muskegon, Mich., a corporation of Michigan Filed July 22, 1957, Ser. No. 673,526

24 Claims. (Cl. 235—61.8)

This invention relates to devices for computing and recording elapsed time and has for its principal object the provision of a new and improved device of this kind.

It is a main object of the invention to provide an elapsed time computer through an operating cycle of which the hours and fractions thereof of working time elapsed between "punch in" and "punch out" are computed and recorded on a card, together with the month, day, hour, and minute at which "punch in" and "punch out" occurred.

Another object of the invention is to provide an elapsed time computer in which mechanical devices in the computer are controlled by electromagnets and in which the circuits for said electromagnets are controlled in part by switches actuated by a card moving in the card chute.

Another object of the invention is to provide an elapsed time computer having a single card slot into which a card is inserted a first time for "punch in," thereby to record thereon the position of the elapsed time mechanisms of the computer at the moment and to mark the card further in a distinctive manner, and also to record upon the card the month, day, hour and minute at which "punch in" occurred.

Another object of the invention is to provide in an elapsed time computer, a punch unit that is stepped forwardly one step at a time at definite intervals of time and in which elapsed time print wheels are stepped forwardly one step each time the punch unit is stepped forwardly one step.

Another object of the invention is to provide an elapsed time computer in which the punch unit includes an hour punch selector and a fractional hour punch selector, both of which are stepped forwardly one step at each respective interval of time and both of which are operated to perforate a card inserted in the computer for a "punch in" operation thereof and in which an hour print wheel and a fractional hour print wheel are each stepped forwardly one step synchronously with the corresponding selector of the punch unit.

Another object of the invention is to provide an elapsed time computer in which forward movement of a previously "punched in" card in the single chute of the computer is arrested with the card in "punch out" position and in which the card in this position initiates a "punch out" cycle of the computer.

Still another object of the invention is to provide an elapsed time computer which during a "punch out" cycle moves a sensing unit from its zero position forwardly over a card and through the number of steps needed to register the sensing unit with the perforations in the card made at "punch in" and in which forward movement of the sensing unit moves the elapsed time print wheels backwards a number of steps corresponding to the number of forward steps of the sensing unit.

Another object of the invention is to provide a computer in which the card is struck against the print wheels by hammers that are actuated by solenoids and in which operation of one of these solenoids also alters electrical circuits in the computer to prevent initiation of another cycle of operation of the computer until the card then in the chute has been removed therefrom.

Another object of the invention is to provide in a computer in which electrical pulses are received at regular intervals, thereby to advance the punch selectors, elapsed time print wheels, the time of day print wheels and the clock mechanism, mechanical means for delaying the advance of these mechanisms when the time pulse ends during a cycle of operation of the computer.

Another object of the invention is to provide in a computer in which solenoids are operated periodically by time pulses preparatory to advancing time mechanisms in the computer upon restoration of the solenoids, means for permitting energization of these solenoids should a time pulse be received during a cycle of operation of the computer, which means also prevents restoration of the solenoids prior to the end of such cycle.

Another object of the invention is to provide in an elapsed time computer, means for preventing advance of the punch selecting mechanism and elapsed time print wheels during non-working periods of the establishment, thereby to eliminate such non-working times from elapsed time computations, which means is ineffective to prevent advance of the clock mechanism and time of day print wheels which therefore at all times read the time of day accurately within the interval of time advanced by the computer.

Another object of the invention is to provide in an elapsed time computer that is operable to record data upon a card, means for locking that card against movement during a cycle of operation of the computer, and to provide an inked ribbon through which printing is accomplished, which ribbon is advanced by each operation of this card holding means.

Another object of the invention is to provide an elapsed time computer which is electrically driven by commercial alternating current.

Further objects of the invention not specifically mentioned here will be apparent from the description and claims which follow, reference being had to the accompanying drawings in which a preferred embodiment of the invention is shown by way of example and in which:

Fig. 9 is a detailed view of the cut-out switch linkage in operated position;

Fig. 9A is a view of the cut-out switch linkage in released position;

Fig. 17 is an elevational view of the differential unit in quarter section, drawn to an enlarged scale;

Figure 1:
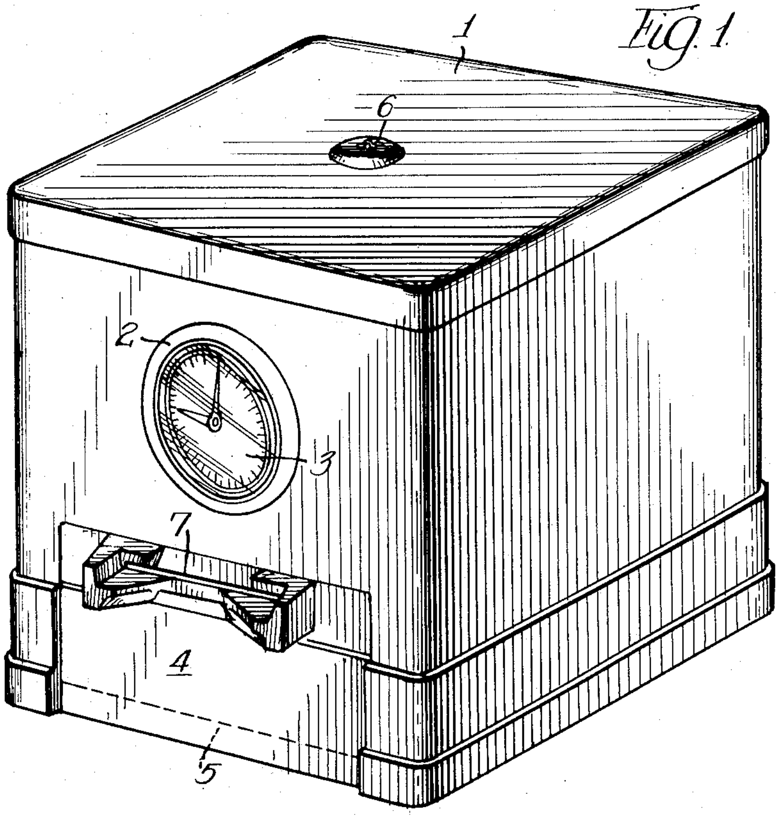
Fig. 1 is a perspective view of the computer with the cover thereof in place.

Throughout the instant specification, the term "punch in" is used to designate a first insertion of a card into the computer to record thereon the time of day and the date, and to punch in the card perforations marking the position of mechanisms therein at the moment. The term "punch in" is commonly used in connection with time clock operation to record the start of a time period even though there be no punching of the card.

Throughout the instant specification, the term "punch out" is used in connection with the re-insertion of a previously inserted card to initiate a computing cycle of the computer. This use is also in keeping with the common practice of referring to a time clock operation by which the end of a time period is recorded, oftentimes without any punching of perforations in the card.

In the computer of the present invention, the operation at "punch out" does not involve any punching of a card but rather involves only reading the card to determine the position of previously punched perforations therein, automatic computation of the elapsed time, and printing upon the card the time of day of "punch out" and also the elapsed time expressed in hours and hundredths of an hour. Therefore it is to be understood that wherever the term "punch out" is used herein, it is meant to refer to this card reading and elapsed time computation cycle, rather than to a punching operation.

In the description to follow, the terms "minutes print wheel" or "minutes type wheel" are used. While this wheel is stepped at intervals measured in minutes, the type faces thereon preferably are in hundredths of an hour rather than in minutes.

*General description*

The elapsed time computer of the present invention is arranged to print upon a card entered in the machine a first time, the month, day, hour and minute of the time when the card is inserted. The minutes time printed by the device is changed once every three minutes so the time of day is thus recorded accurately within the three minute margin. Also, when a card is inserted in the computer for a first time, the device punches in the card a pair of perforations indicative of the hour and minutes (in three minute steps) position of the apparatus at the time of entry of the card. The positions of the holes thus punched in the card do not indicate the time of day at which the holes were punched, but only the positions of the punches selected and operated. The card is also punched in a distinctive manner to indicate that it has been punched in.

The position of the punch selector is changed at three minute intervals during working hours. Geared to the punch selector through gear trains that include differential gears, are elapsed time print wheels, two in number, one arranged to print hours of elapsed time and the other to print minutes of elapsed time expressed either in steps of three minutes each, such as 00, 03, 06, etc., or preferably expressed as hundredths of an hour as .00, .05, .10, etc. These print wheels are stepped in unison with the punch selectors, and each time the position of a punch selector is changed one step the position of the corresponding elapsed time print wheel is changed one step.

The computer is a single slot device, that is, there is but one slot or chute into which a card may be inserted. Movement of a card inwardly in this chute registers the card with a first position in which the card engages a lever and moves that lever to operate a pair of snap action electric switches by which the computer is conditioned for a cycle of operation.

Further movement of the card inwardly in the chute registers it with a second position in which the card is tested to determine whether or not it has previously been operated upon by the computer. Upon the initial entry of a card in the chute, a lever is engaged by the card and as the card moves forwardly the lever is moved to clear the chute thereby to permit movement of the card through the second and into a third position.

In this third position, the leading edge of the card engages a lever that is moved by the card to operate a snap action switch that closes a circuit for the electric motor that drives the computer, closes a circuit to a punch clutch solenoid, and also closes a circuit to a "ribbon advance and card hold" solenoid.

Operation of the "punch clutch" solenoid over this circuit connects the motor to the "punch" drive shaft of the computer to drive that shaft through a single revolution under the control of a single revolution clutch.

Operation of the "punch" drive shaft operates the punch unit to punch in the card a pair of holes indicative of the positions of the selected punches. The punch unit operation also chamfers or cuts away a corner of the card to mark that card as having been operated on by the computer. A cam on the punch drive shaft operates a snap action switch to close a circuit to the time of day print solenoid, operating that solenoid to strike the card against the time of day print wheel to record on the card the month, day, hour and minute shown by the clock on the device.

Operation of this print solenoid disengages the pair of switches from the lever by which they were operated by the card in the first position, restoring said switches to prevent further operation of the computer until the card is withdrawn from the chute far enough to permit the lever engaged thereby to restore to normal. A cam on the punch drive shaft closes an auxiliary circuit for the motor to insure that this shaft will be driven through a complete revolution. Restoration of this lever to normal by removal of the card from the chute reconnects it in operative relation to the switches in readiness for another operation of the computer.

As previously pointed out, the punch unit and elapsed time print wheels are advanced one step only for every three minutes of working time. The clock and time of day print wheels are advanced one step every three minutes and always are in position indicating the time of day within three minutes.

When the workman, who punched in as above, finishes the work assigned, he re-inserts the same card in the chute of the computer. As the card moves through the first position, the computer is conditioned for operation as before. As the card moves into the second position, the cut-away corner on the card prevents its engagement with the lever by which the chute was cleared to permit passage of the card through the second position; therefore forward movement of the card is stopped with the card in the second position.

In the second position, the leading edge of the card engages a lever and operates that lever to operate a snap action electric switch. Operation of this switch closes a circuit for the motor by which the computer is driven and also closes a circuit for the "computer" clutch solenoid. Thus the motor is started and is connected through the clutch to operate the "computer" drive shaft through a single revolution. The circuit of the card hold solenoid is also closed as before.

Located in the second position in which the card now is, is a sensing unit that is driven forwardly over the card by the operation of the "computer" drive shaft in search of the perforations of the card indicating the position of the computer at "punch in." Assume now that the punch unit was in position 5 at "punch in." The elapsed time print wheel then was in position to print five three-minute units or .25 of an hour. Assume further that thirty minutes of working time have elapsed between "punch in" and "punch out." The punch selector and minutes elapsed time print wheel will each have advanced ten steps during the assumed thirty minutes of working time and the punch unit will be in its fifteenth position and the elapsed time print wheel will be set to print .75 hour.

The sensing unit is always in its zero position when the computer is at rest. Operation of the "computer" drive shaft moves the sensing unit forwardly over the card until the perforation therein is reached. In the example under consideration, the sensing unit will move forward through five steps to reach the perforation. Forward movement of the sensing unit acting through the differential gear in the gear train moves the minutes print wheel backward the same number of steps as the sensing unit moves forwardly. Thus the print wheel is moved backwardly subtracting five units from its .75 setting and the wheel comes to rest in position to print .50 hour, which is the elapsed time in the assumed example.

During the single revolution operation of the "computer" drive shaft, a cam on that shaft operates a snap action electric switch to close a circuit through the "elapsed time" hammer solenoid with a parallel circuit through the "time of day" hammer solenoid operating those solenoids. The hammers are thus operated to strike the card against the print wheels to print on the card the month, day, hour and minute at "punch out," and the elapsed time in hours and hundreds of an hour. Since in the example under consideration the elapsed time is one-half hour, the elapsed time recorded on the card will be 0.50.

Further rotation of the "computer" drive shaft moves the sensing unit back through five steps to its zero position, and through the differential gear moves the minutes elapsed time print wheel forwardly through five steps to its fifteenth position, that being the position which it occupied at the start of example under consideration. It will be noted that movements of the sensing unit do not affect the punch selector which remained in its fifteenth position throughout this "punch out" operation.

Operation of the "time of day" hammer solenoid disengages the lever actuated by the card in the first position from the snap switches operated thereby to prevent further operation of the switches, thereby preventing further cycling of the computer until the card has been withdrawn from the chute. A cam on the "computer" drive shaft closes an auxiliary circuit for the motor to insure that the shaft will be driven through one complete revolution.

It will be noted that the punch unit includes punches selectively operated to indicate the hour position of the unit. The hour setting of the unit is changed by a Geneva gear as the minutes selector of the unit moves from its nineteenth to its twentieth position. The twentieth position coincides with the 00 position of the unit. The hour print wheel is likewise stepped by a Geneva gear in the differential unit as the minutes wheel moves from its nineteenth to its twentieth position, which also coincides with its 00 position. The sensing unit includes an hour sensing portion and forward movement of that portion acting through the differential gear steps the hour print wheel back a number of steps corresponding to the forward steps taken by the hour sensing portion of the unit. This operation duplicates that of the minutes portions of the units and need not be described in further detail here.

An elapsed time computer should compute and record working time only, and lunch periods, rest periods and intervals between shifts must be deleted from the computations if the computations are to be accurate. For example, if a workman punches in on a job at 11:45 a.m., and the shop has a lunch period of thirty minutes beginning at 12:00 noon, if the workman finishes the assignment at 12:45 p.m., he will have worked on it but thirty minutes, fifteen minutes before and fifteen minutes after lunch. The clock time elapsed is one hour, half of which was not working time.

To care for contingencies of this kind, the computer is equipped with a "time out" disk which is stepped by a solenoid one step every quarter of an hour. The time of day gear train is equipped to operate a snap action electric switch once each fifteen minutes. The "time out" disk makes one revolution each twenty-four hours. Positioned on the disk are cam plates which engage a lever that opens a normally closed electric switch when the lever rides over the dwell of the cam plate. The switch is included in the circuit of the solenoid by which the elapsed time portion of the computer is operated. In a shop having a 12:00 to 12:30 lunch period, the cam plate is located so as to engage the lever as the clock and disk move into 12:00 position. The circuit of the elapsed time solenoid is thus opened.

During the next five pulses, the time of day mechanism is operated, but the punch selector and elapsed time print wheel remain stationary. The fifth pulse moves the "time out" disk one step, but the lever stays in engagement with the cam plate dwell and the circuit controlled by it remains open. The next five pulses produce the same effect. The tenth pulse operates the disk another step, moving the cam dwell out of engagement with the lever, permitting the switch to restore and close its normally closed contacts. When the next time pulse is received at 12:33, the punch selector and elasped time print wheel are advanced one step in unison with the time of day mechanism.

In a shop in which the morning and afternoon rest periods of fifteen minutes or multiples thereof are not charged to the job, the disk can be equipped with other cam plates which hold the circuit of the elasped time solenoid open during the rest periods. In shops where rest periods are charged to the job, these cam plates are not used. If desired, cam plates for holding the circuit open during intervals between shifts may be provided.

With the arrangement for "taking out" non-working times as above, the computer never has to be reset at the beginning of a day or work shift. Since the elapsed time mechanism is stepped forwardly at regular intervals during working hours in the shop, and only during working hours, it is at all times capable of computing elapsed working time between "punch in" and "punch out" of a particular card.

In a shop in which a working shift starts at, say 8:00 o'clock, it is advisable to put on the time out disk a fifteen minute cam, so as to prevent movement of the elapsed time mechanism during the interval between 7:45 and 8:00 o'clock. With this arrangement, although workmen "punch in" prior to 8:00 o'clock, the elapsed time shown on the card at "punch out" will not include any time prior to 8:00 o'clock, the starting time of the shift. Preferably similar cams will be placed on the disk to block out the fifteen minute periods preceding the starting time of other shifts.

In the embodiment shown in the drawings, the computer is arranged to compute and record a maximum of twelve hours of elapsed working time, that being the maximum encountered in a majority of instances. The punch unit shown has but twelve hour punches, and the hour elapsed time print wheel has but twelve positions. If desired, both of these devices may be enlarged to twenty-four positions so as to equip the machine to compute and record elapsed working time up to twenty-four hours. In the computer shown, the time of day hour print wheel has twenty-four positions.

As shown in the drawings, the computer is a complete unit and includes a synchronous clock motor geared to close pulse forming snap switches once every three minutes to form a pulse of one second duration. If desired, the clock motor can be omitted from the individual computers and the pulses sent out from a master clock to all the computers in the establishment. These three minute time pulses operate the solenoids by which the elapsed time mechanism, the time of day mechanism, and the time out disk are advanced. These solenoids do not advance their respective mechanisms upon energization of the solenoid, but rather upon restoration to normal thereof. Obviously, if a time pulse is ended during a computing cycle, the result will be erroneous. To guard against this, the computer is equipped with means for holding the solenoids operated until the computing cycle is completed, nothwithstanding that the time pulse ends before the completion of the cycle. The advance of the mechanisms is accomplished immediately upon the completion of the computing cycle. This holding means does not interfere with the energization of the solenoids should a time pulse begin during an operating cycle of the computer.

Referring now to the drawings in more detail, particularly Figs. 1 to 6, inclusive, it will be seen that the preferred embodiment of the invention is enclosed in a casing 1 through a window 2, in which the clock 3 is visible. The clock as shown is a twelve hour clock.

Located on the front of the machine beneath the clock is the card chute guide plate 4, through which cards are inserted into the machine. The casing 1 is secured on the framework 5 by a lock 6 which facilitates ready removal of the casing, thereby to give access to the computer mechanism.

Figure 2:
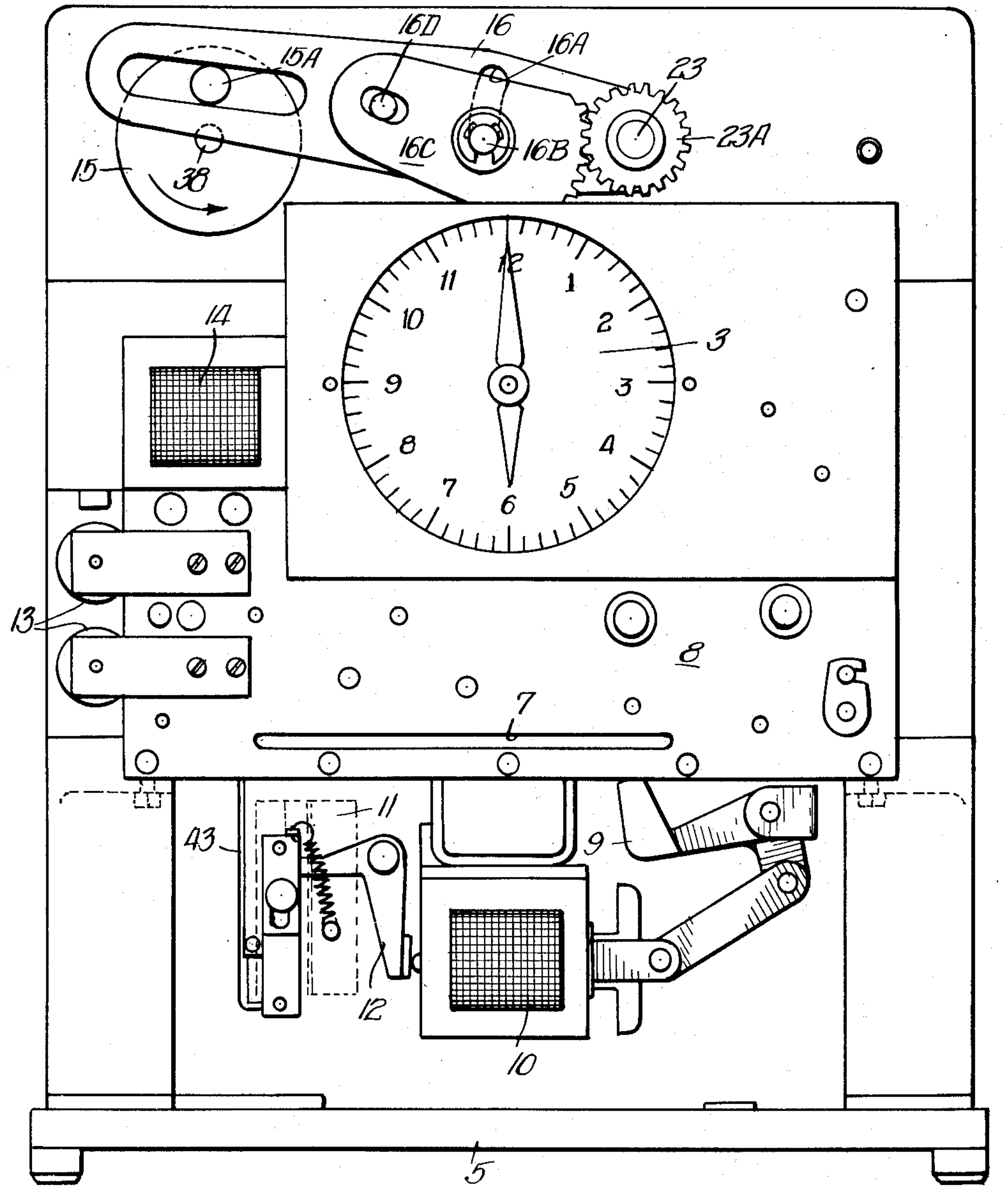
Fig. 2 is a front view of the computer with the cover and card chute guide plate removed.

As will be seen in Fig. 2, when the cover 1 and guide plate 4 are removed, the card chute 7 opens into the front plate 8 of the printing unit of the machine. Located beneath the card chute 7 is a time of day print hammer 9 and solenoid 10 by which the hammer is operated. Also mounted beneath the card chute 7, at the front edge of the machine, is a make-ready switch assembly 11 and a latching mechanism 12.

Located at the front edge of the machine, back of the front plate 8, are ribbon rolls 13 through which printing is accomplished. The time of day operating solenoid 14 is positioned adjacent to and above the ribbon rolls 13.

Located above the clock face 3 is a drive disk 15 and a lever assembly 16, through the operation of which elapsed time is computed, as will hereinafter appear.

Figure 3:
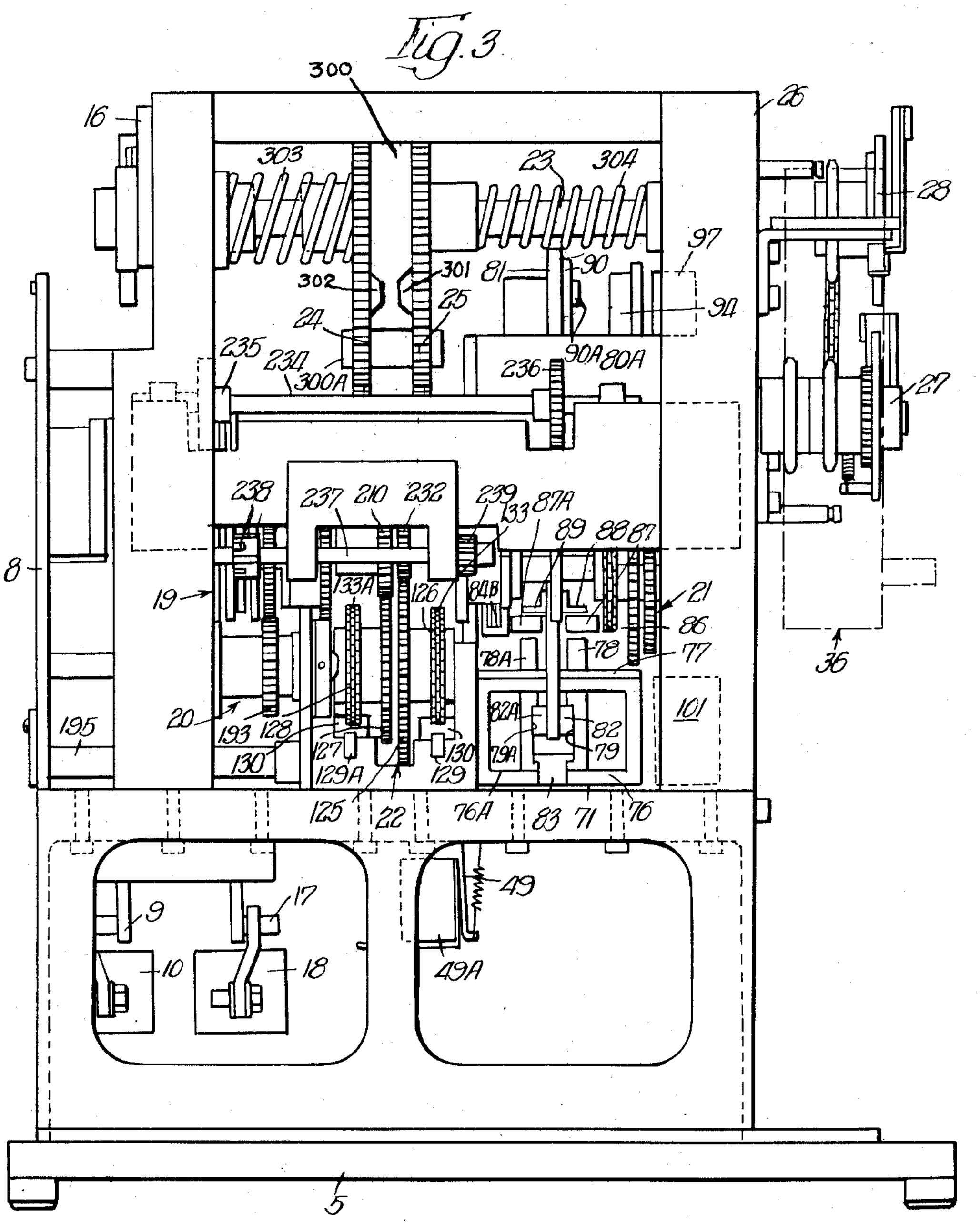
Fig. 3 is a right side elevational view of the computer with the cover removed.

As will be seen in Fig. 3, viewed from the right side of the machine, the elapsed time print hammer 17 and solenoid 18 for operating the same, are positioned immediately rearwardly of the "time of day" hammer 9 and its solenoid 10. Located above the card chute is the differential mechanism indicated generally at 19, the print mechanism indicated generally at 20, the punching unit indicated generally at 21, and the sensing unit indicated generally at 22. Also visible from the right hand side of the machine, near the top of the framework thereof, is the segment drive shaft 23 and segments 24 and 25, by which the sensing unit is driven through an operation of the lever assembly 16. Located at the rear of the machine back of the back plate 26, is the single revolution clutch 27 that controls the operation of the machine at "punch in," and a single revolution clutch 28 that controls the operation of the machine at "punch out."

Figure 5:
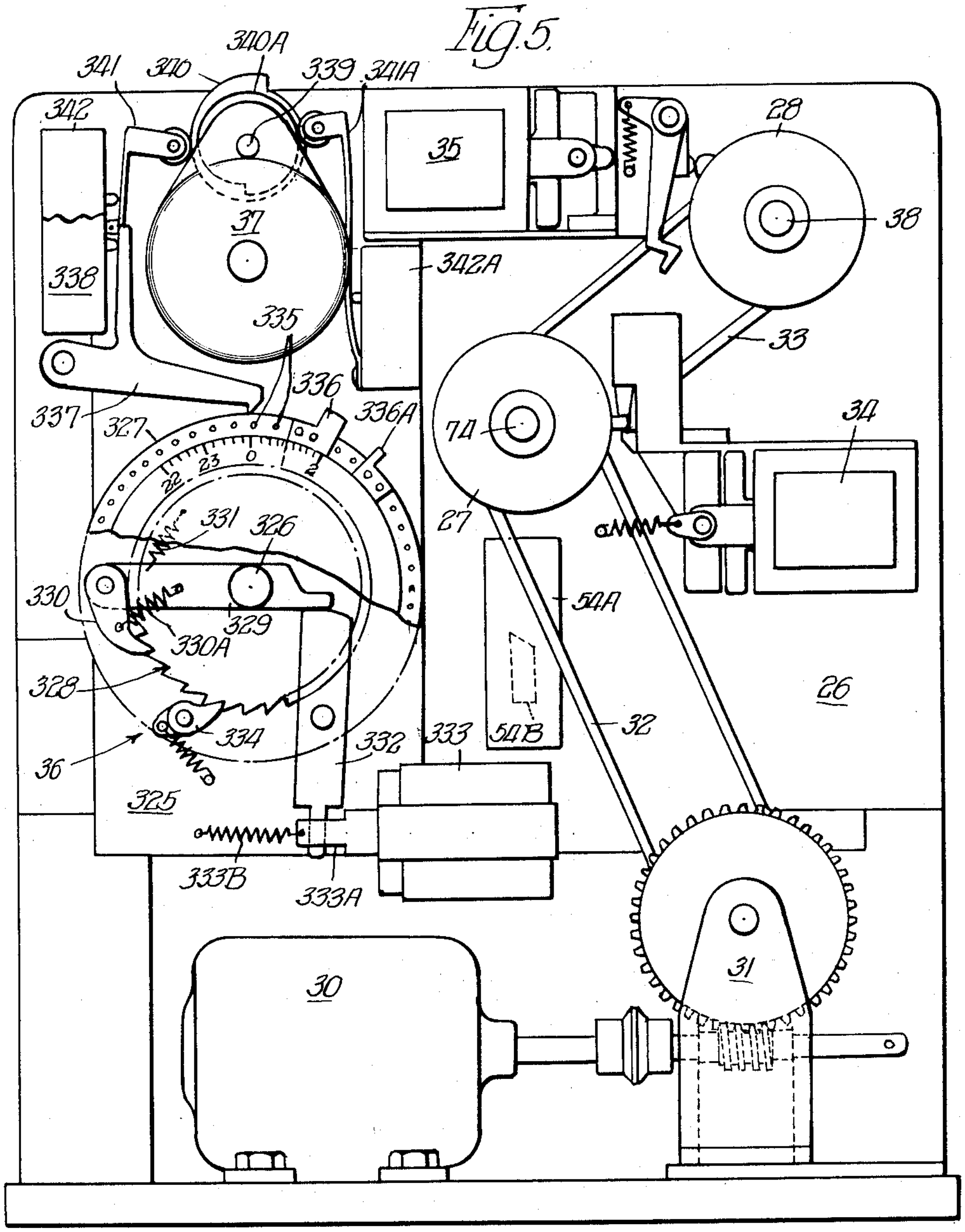
Fig. 5 is a rear elevational view of the computer with the cover removed.

As will be seen in Fig. 5, located back of the back plate 26 is the motor 30, speed reducer 31, main drive chain 32 that connects the speed reducer 31 to the "punch" shaft assembly upon which clutch 27 is mounted, auxiliary chain 33 by which the "computer" drive shaft upon which clutch 28 is mounted is connected to the motor, solenoid 34 for operating the "punch" clutch 27, solenoid 35 for operating the "computer" clutch 28, time out disk mechanism 36, and synchronous clock 37.

Figure 6:
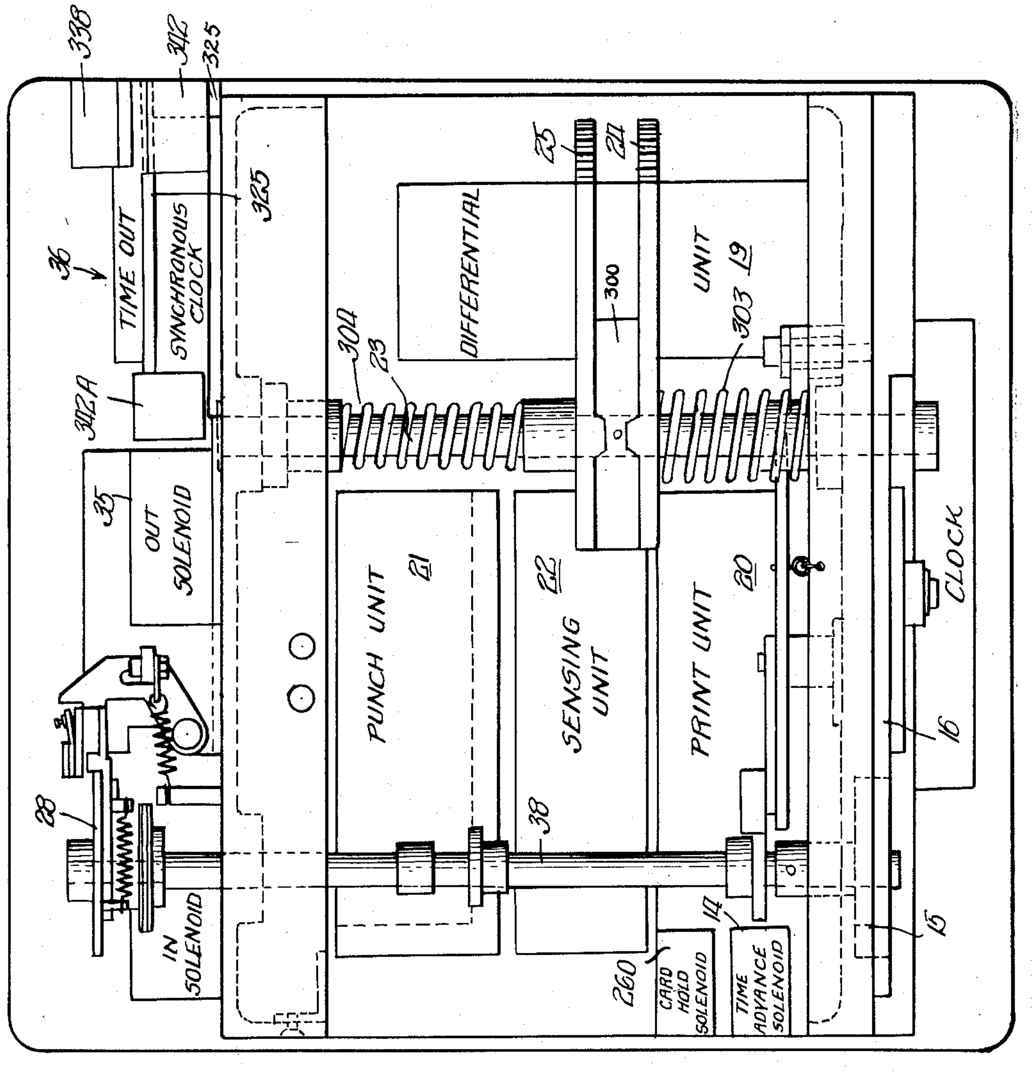
Fig. 6 is a plan view of the computer with the cover removed and with the units thereof diagrammatically shown.

As will be seen best in Fig. 6, the differential unit 19, indicated by the rectangle, is located adjacent the right hand side of the machine, the print unit 20 is located to the left center at the front of the machine, the sensing unit 22 is located immediately behind the print unit, and the punch unit 21 is located immediately behind the sensing unit. The "computer" drive shaft 38 extends from back to front of the machine and carries at its front end the disk 15 by which the lever assembly 16 is operated. The "computer" clutch 28 is positioned on this shaft.

Figure 4:
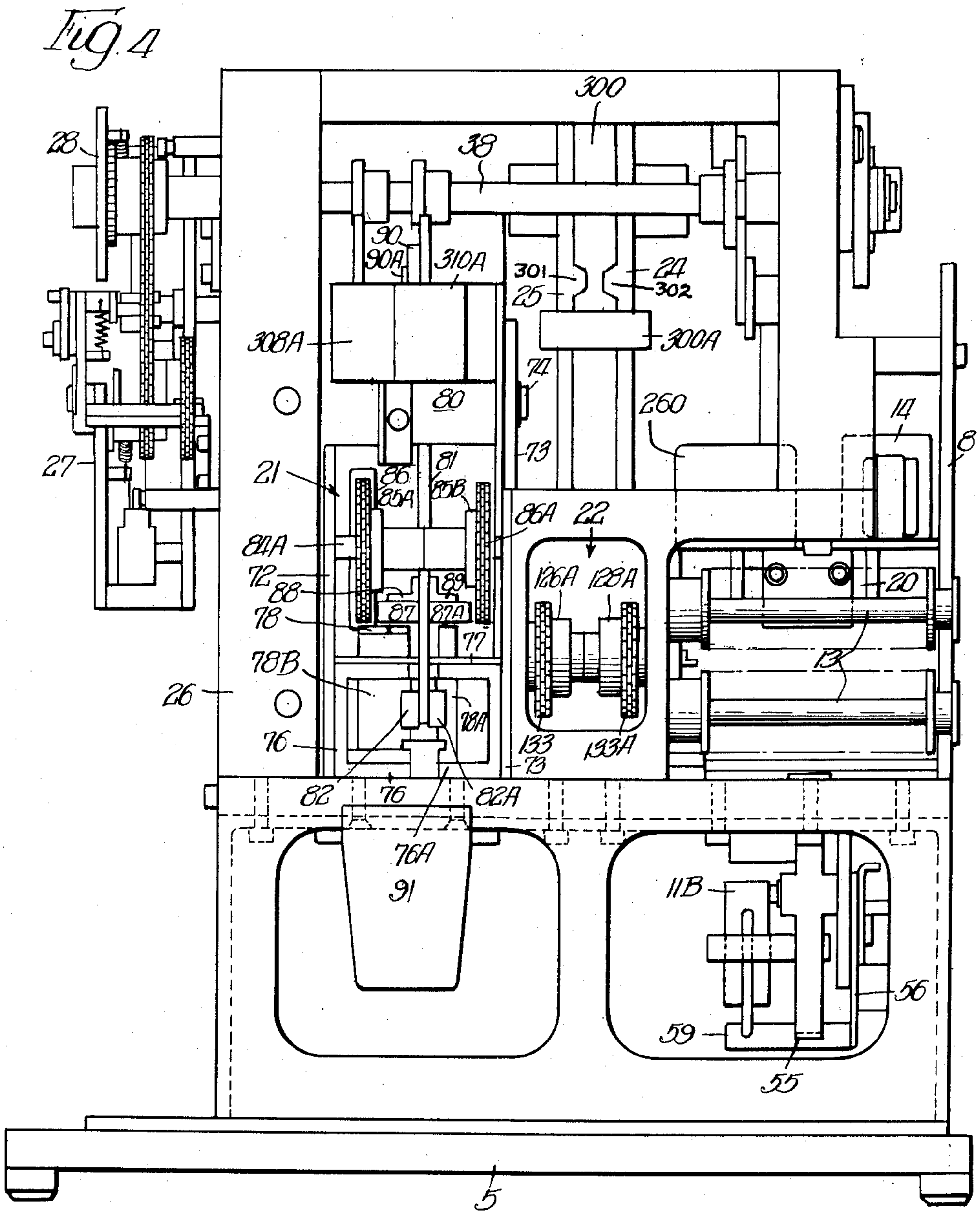
Fig. 4 is a left side elevational view of the computer with the cover removed.

As will be seen in Figs. 4 and 6, the punch unit 21, sensing unit 22, and print unit 20 all extend into juxtaposition with the left edge of the framework of the machine and all are located so that the portions of card chute in the individual units are aligned. The "computer" clutch 28 and "punch" clutch 27 are located near the left hand side of the computer.

*The card chute*

Figure 7:
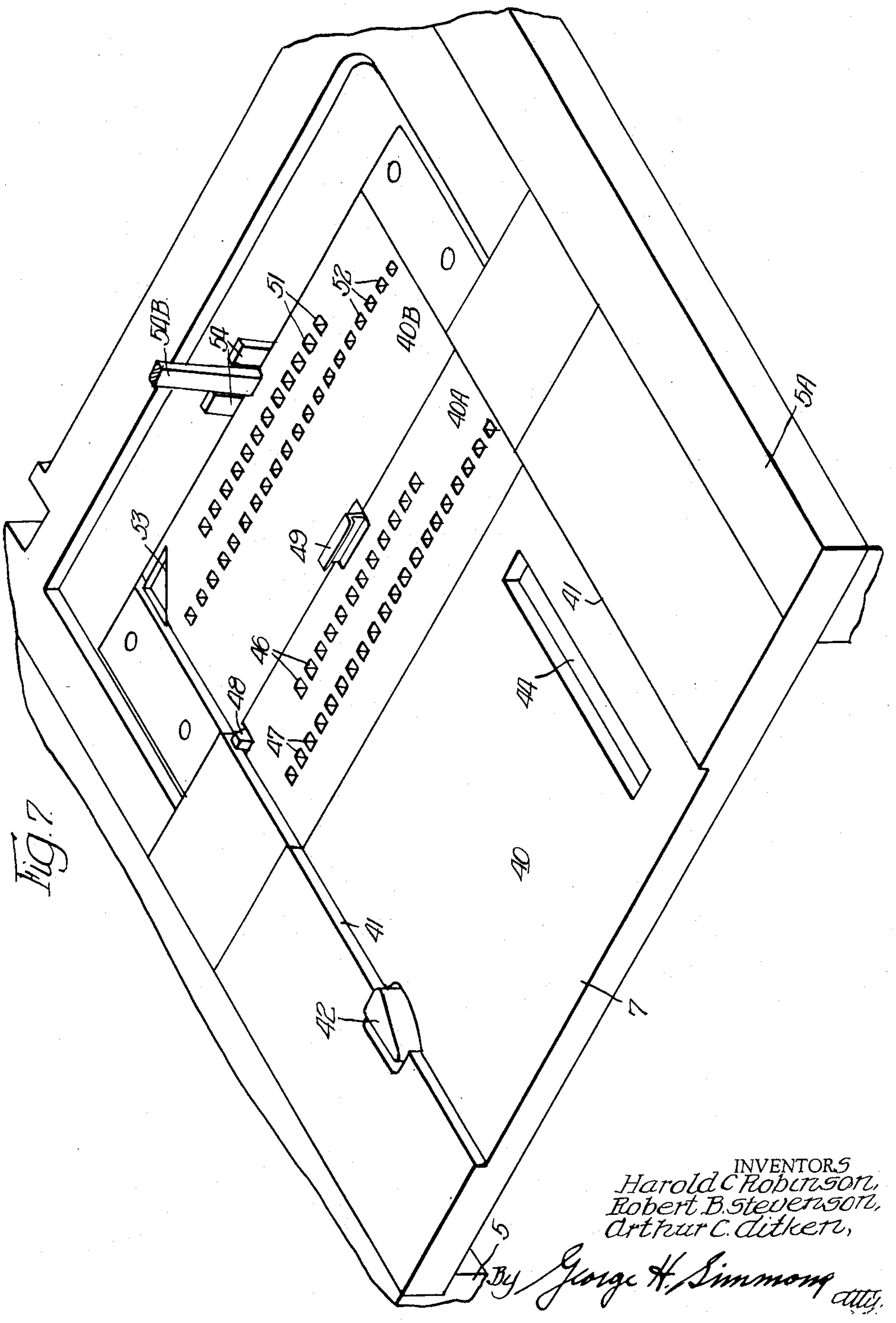
Fig. 7 is a detailed fragmentary view of the card chute.

As will be seen best in Fig. 7, the bottom portion of the framework, consisting of two side plates 5 and 5*a*, is notched to accommodate the bases 40, 40*a* and 40*b*, said bases being part of print unit 20, sensing unit 22, and punching unit 21, respectively. These bases are notched to form upstanding guides 41 and collectively define the card chute 7.

Projecting into the card chute 7 is a cam 42 that is attached to the upper end of lever 43, Figs. 2, 9 and 9A, for a purpose hereinafter to be described. Located adjacent the opposite edge of the card chute 7 is a perforation 44 in the plate 40, through which the print hammers 9 and 17 operate to strike a card against the print wheels of the device.

Located in the plate 40*a* are two rows of perforations 46 and 47, corresponding respectively to the hours and minutes portions of the computing equipment. Since the computer shown by way of example is arranged to compute only a maximum of twelve hours, row 46 contains twelve perforations; and since this computer is designed to record minutes in three minute steps, row 47 contains twenty perforations. The perforations in rows 46 and 47 are uniformly spaced apart.

Adjacent the rear edge of plate 40*a*, alongside the left hand guide 41 of the chute, is a lever 48 by which control of the machine is effected. Also located at the rear edge of plate 40*a* and on the median line of the card chute 7 is a stop lever 49 by which the machine is controlled under certain conditions.

Located rearwardly of the plate 40*a* is the bottom die plate 40*b* of the punch unit 21. Plate 40*b* contains a row 51 of hour perforations and a row 52 of minute perforations, and the perforations in rows 51 and 52 correspond in number, purpose and spacing with those in rows 46 and 47. Die plate 40*b* also contains a triangular perforation 53 by which a card is marked during the operation of a "punch in" cycle of the computer.

Projecting upwardly from the rear edge of die plate 40*b* is a bifurcated stop 54 that is engaged by a card in the card chute 7 during a "punch in" cycle of operation of the computer.

*Preparing the computer for a cycle of operation*

As will be seen in Figs. 2 and 9, cam 42, fixed upon the upper end of lever 43, will be moved outwardly by the leading edge of a card entering the card chute 7, thereby to move lever 43 about its pivot from its normal position shown in dotted lines in Fig. 9, to its operated position shown in solid lines therein. At the lower end of lever 43 is an arm 55 that engages an operating bar 59 carried by lever 56, that is pivoted at 57 to an L-shaped pivot bar 58. Movement of lever 43 from its normal to its operated position rotates operating bar 59 and lever 56 around its pivot 57, thereby to move the snap switch assembly 11 from its normal to its operated position. This operation of switch assembly 11, which in the model shown comprises two independent switch units 11*a* and 11*b*, prepares electrical circuits over which the computer is subsequently controlled.

*Repeat operation prevention*

As will be seen in Figs. 4 and 9, solenoid 10, by which the time of day hammer 9 is operated, carries a rod 60 that engages the pivoted bar 58 when the solenoid is moved to its operated position as shown in Fig. 9*a*. This movement rotates bar 58 around its pivot, thereby raising the lever 56 and bar 59 sufficiently to permit the arm 55 on lever 43 to slide beneath the lower edge of the bar 59. This permits the operating arm 59 of the switch assembly 11 to restore the switches to normal, thereby to prevent a re-operation of the computer until the card in the card chute 7 has been withdrawn sufficiently to clear the cam 42 and thereby permit spring 61 to restore the cam and lever 43 to their normal positions. It will be noted that so long as the cam 42 is in operated position, arm 55 will be disposed beneath the operating bar 59 to hold that bar in elevated position after the solenoid 10 de-energizes and restores to its normal position.

Through this arrangement repeat operations on a single card, either at "punch in" or "punch out," are definitely prevented and the machine prevented from re-cycling until the card is withdrawn practically completely from the card chute 7.

*Clearing the card chute for a "punch in" cycle*

Cards which have not been previously "punched in" by the computer are rectangular in shape. As the card is moved rearwardly in the chute 7 through the first zone thereof in which cam 42 is operated, and into the second zone in which the forward end of the card overlies the plate 40*a*, the square leading edge of the card will engage the lever 48, Figs. 7 and 10, prior to the engagement of the leading edge with the stop 49 in the manner shown in Fig. 10. Lever 48 is mounted upon a rotatable shaft 62 which at its other end carries a bracket 63 upon which the stop lever 49 is pivotally mounted.

As will be apparent from Fig. 7, the card chute 7 is normally blocked by stop lever 49 that projects into the chute at the rear end of the second zone therein. Lever 48 is located slightly forwardly of the stop lever 49.

Figures 10, 10A, 12, 13:
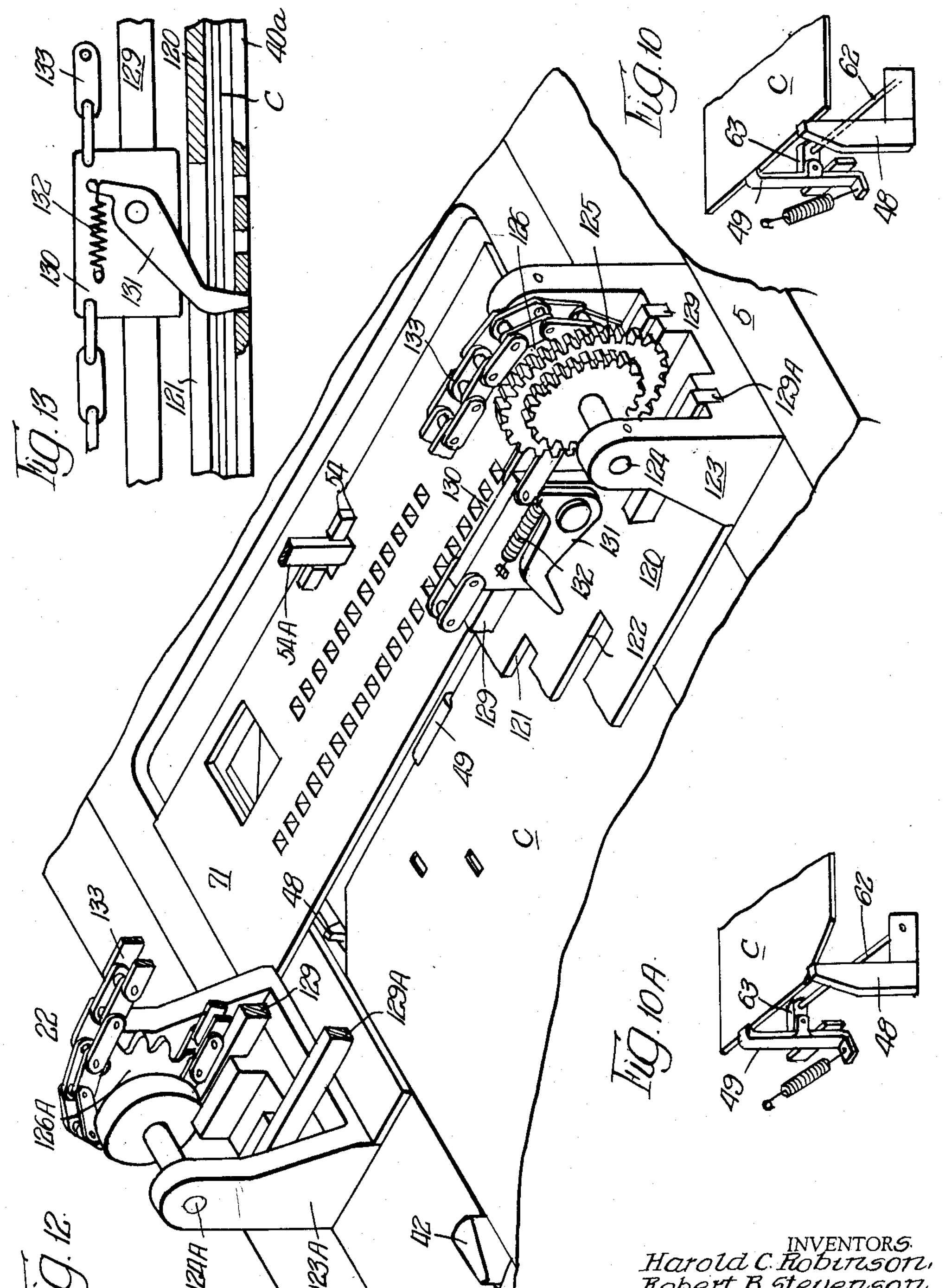
Fig. 10 is a fragmentary view of the mechanism for determining whether a card is being inserted for a "punch in" or a "punch out" operation with a card inserted for "punch in"
Fig. 10A is a view similar to Fig. 10, showing a card inserted for "punch out"
Fig. 12 is a fragmentary perspective view of the sensor unit.
Fig. 13 is a fragmentary detailed view with the sensor registered with a perforation in the card.

When the card C engages the lever 48, forward movement of the card rotates that lever and the bracket 63 in a counterclockwise direction, as seen in Fig. 10. This lowers the pivotal connection between the stop lever 49 and bracket 63, with the result that the stop lever 49 is lowered below the upper surface of the plate 40*a*. The card C is thus rendered free to pass through the second zone in the card chute and into the rear third zone thereof.

*Initiating a "punch in" cycle*

Movement of the card C through the third zone brings its leading edge into registration with the lever 54*b* of the "in" snap switch 54*a*, thereby to operate the switch the lever 54*b* of which is slightly in advance of stop 54 and thereby initiate a "punch in" cycle of the computer.

*Card hold and ribbon advance*

Figure 8:
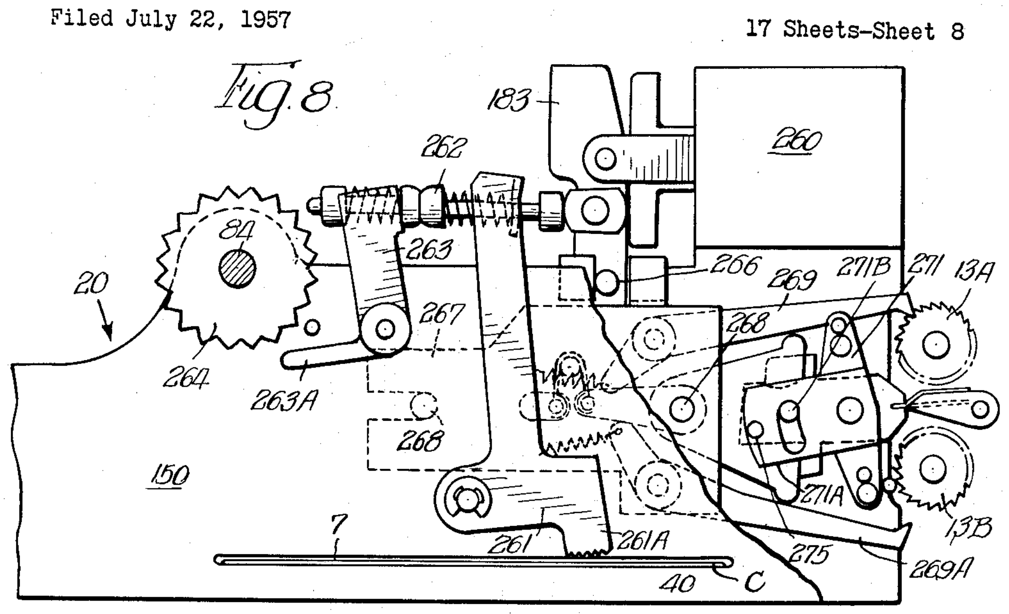
Fig. 8 is an elevational view of the card hold and ribbon advance mechanism, looking forwardly of the computer from the back side of the print unit, with the rear plate thereof partially broken away.

As will be seen in Fig. 8, the card hold and ribbon advance mechanisms are mounted upon the rear wall 150 of the print unit 20. The card hold mechanism consists of a lever 261 which is pivotally mounted upon the wall 150 and connected to the lever 183 of the print unit by a link 262. Through this arrangement, when the solenoid 260 operates its armature, levers 183 and 261 are rotated clockwise, as seen in Fig. 8, around their respective pivots. Card hold lever 261 has a serrated projection 261*a* which is thus moved into engagement with a card C in the card chute 7, pressing that card down against the bottom plate 40 of the card chute, thereby to hold the card against movement during the cycle of operation of the computer. Link 262 is extended through lever 263 which is spring pressed by movement of the link 262, thereby to rotate lever 263 about its pivot. An arm 263*a* is thus moved into engagement with a star wheel 264 which is fixed upon the shaft 84 of the punch unit 21, thereby locking that shaft against rotation during an operating cycle of the computer. As will presently appear, solenoid 260 is energized in multiple with the motor 30 of the computer and remains energized throughout the cycle of operation.

Figure 8A:
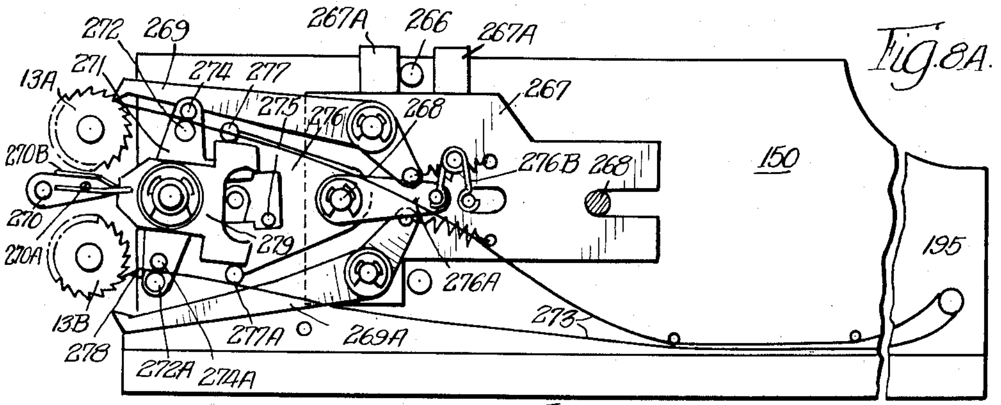
Fig. 8A is a detailed view of the ribbon advance mechanism viewed from the front side of the back plate of the print unit.

Lever 183 carries a pin 266 that extends between projections 267*a* on a slide plate 267 that is mounted on the forward face of the back wall 150 of the print unit. Plate 267 is mounted upon pins 268 that are fixed on the wall 150 and extend through slots in the plate 267. Movement of the lever 183 upon energization of solenoid 260, moves the pin 266 to the left, as seen in Fig. 8A. Ribbon drive rolls 13 consist of an upper roll 13*a* and a lower roll 13*b* that are journaled in brackets located adjacent the front and back walls of the print unit. Each of these rolls 13*a* and 13*b* carries a ratchet wheel located in juxtaposition to the back wall 150 of the print unit.

Pivotally mounted upon the slide plate 267 are pawls 269 and 269*a*. A spring carried by the plate 267 rotates the pawl 269 around its pivot into engagement with the teeth of the ratchet carried upon ribbon roll 13*a*. Through this arrangement it is obvious that movement of the slide plate 267 to the left will rotate roll 13*a* counterclockwise, as seen in Fig. 8A, thereby to wind the ribbon on that roll. A detent 270 carries a pin 270*a* which engages a finger spring 270*b* and is pressed thereby into engagement with the roll 13*a* to prevent reverse movement of the ribbon roll.

Pivotally mounted between the front and back walls of the print unit and extending therebetween is a cage having an end plate 271 disposed adjacent the back wall 150. Extending between this end plate and a similar end plate adjacent the front wall 151 of the unit are rods 272 and 272*a* which guide the ribbon 273. Also mounted on the plate 271 and extending forwardly therefrom a short distance are pins 274 and 274*a*. The ribbon 273 extends between the rods 272 and 272*a* and the pins 274 and 274*a*, respectively, for a purpose hereinafter to be explained.

Ribbon 273 extends from the rod 272*a* to the right, as seen in Fig. 8A, above the card chute and around an idle roller 195 at the right hand end of the print unit, thence to the left between the ribbon and print wheels to the rod 272, and thence to the roll 13*a*. The ribbon extends essentially from front to back of the print unit and is wide enough to engage all of the print wheels thereof during a printing operation. Preferably the ribbon is a two-color ribbon with one color engaging only the elapsed time print wheels 157 and 158, with the result that the elapsed time record printed upon a card is in a color contrasting from the time of day record printed thereon.

As will be seen best in Fig. 8, the end plate 271 carries an extension 271*a*, and a pin 275 projects forwardly from this extension 271*a*. A pin 271*b*, fixed upon the back wall 150, projects into a slot in the projection 271*a* to limit rotation of the cage about its pivot.

Pivotally mounted upon the left hand pin 268, as seen in Fig. 8A, is a toggle link 276 having a bifurcated end forming a slot into which pin 275 projects. Toggle link 276 contains at its extremities pins 277 and 277*a*, positioned to engage the pawls 269 and 269*a*, respectively. With the cage 271 and the toggle link 276 in the position shown in Fig. 8A, pin 277*a* rotates pawl 269*a* counterclockwise around its pivot, thereby disengaging it from the ratchet on the ribbon roll 13*b*, leaving that roll free to rotate. Toggle 276 carries an extension 276*a* against which a spring 276*b* presses to maintain the toggle in its limits positions.

Ribbon 273 carries pins 278 adjacent its ends. Continued operation of roll 13*a* to wind the ribbon 273 thereon moves pin 278 on the lower run of the ribbon into engagement with the lower rod 272*a* and the lower pin 274*a*. Continued movement of the ribbon rotates the cage and end plate 271 thereof counterclockwise about its pivot, thereby moving pin 275 upwardly, as seen in Fig. 8A, into engagement with the upper edge of the slot in toggle 276, moving that toggle clockwise about its pivot, thereby to cause pin 277 to engage the pawl 269 and to rotate that pawl clockwise about its pivot and out of engagement with the ratchet on ribbon roll 13*a*. Upward movement of the toggle 276 raises pin 277*a*, thereby permitting pawl 269*a* to be rotated by its spring in a clockwise direction about its pivot and into engagement with the ratchet on ribbon roll 13*b*.

Ribbon ratchet control plate 279 is journaled on the same pivot as the cage and is engaged by pins 277 and 277*a*. Movement of the toggle 276 clockwise about its pivot and consequent raising of the pin 277*a*, rotates the plate 279 counterclockwise on its pivot. Finger springs 270*b*, by which the retaining pawl 270 is maintained in engagement with the ratchets on the ribbon rolls, is carried by the plate 279. This counterclockwise movement of plate 279, acting through spring 270*b* and pin 270*a*, moves the pawl 270 out of engagement with the ratchet on roll 13*a* and into engagement with the ratchet on roll 13*b*. Through this arrangement subsequent movements of the slide plate 267 cause the pawl 269*a* to rotate ribbon roll 13*b* in a clockwise direction, as seen in Fig. 8A, thereby to wind the ribbon on that roll, roll 13*a* being freely rotatable during this operation.

*The "punch" unit*

Figure 11:
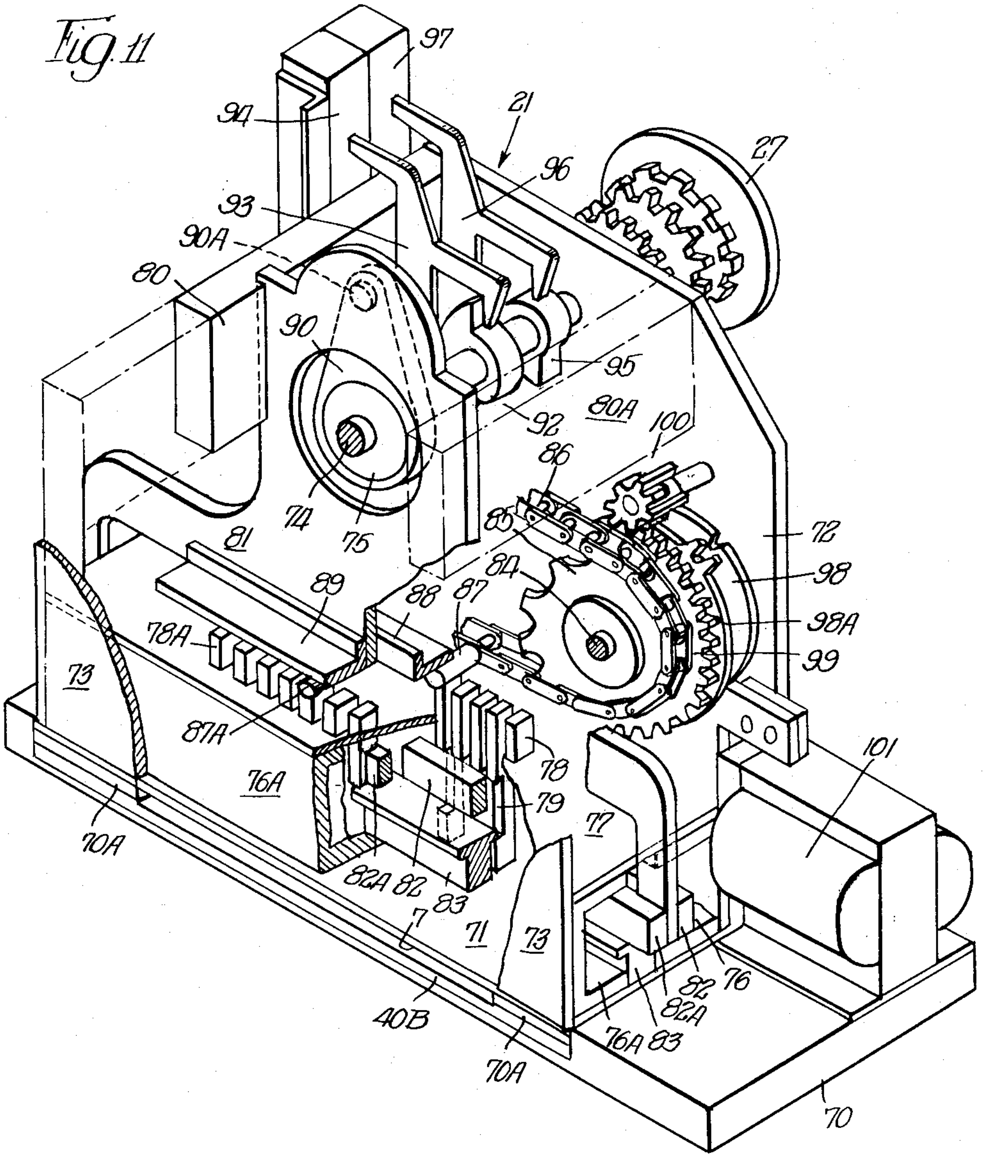
Fig. 11 is a perspective view of the punch unit.

Located at the rear end of the card chute 7 is a "punch" unit 21, shown in Fig. 11, and visible in end elevation in Figs. 3 and 4. This unit consists of a base plate 70 in a recess in which the lower die plate 40*b* is fixed. Spacers 70*a* fixed upon the die plate 40*b* support the lower punch guide plate 71 that defines the upper limit of the card chute 7. Fixed upon the lower punch guide plate 71 are brackets 76 and 76*a* which are channel shape in cross section. Fixed to and upstanding from the front bracket 76*a* is a front plate 73 which is broken away in Fig. 11 to prevent concealing devices disposed behind it. Upstanding from and fastened to the base 70 is a back plate 72. Journaled between the front and back plates 73 and 72, and located near the top thereof, is the "punch" drive shaft 74, upon which an eccentric cam 75 is fixed.

Fixed at the upper ends of brackets 76 and 76*a* is an upper punch guide plate 77. Guide plates 71 and 77 each contain two rows of perforations corresponding in number and location to the rows of perforations 51 and 52 in the lower die plate 40*b*.

Mounted between the lower plate 71 and the upper plate 77 are a plurality of punches 78 and 78*a*, each of which contains a slot 79 recessed into one of its vertical edges. Slots 79 in punches 78 open forwardly of the computer and slots 79*a* in punches 78*a* open rearwardly thereof, as will be best seen in Fig. 3.

Extending between the back plate 72 and front plate 73 of the punch unit are mounting blocks 80 and 80*a*. Block 80*a* is shown in phantom in Fig. 11, and block 80 is broken off intermediate the plates so as to avoid hiding apparatus located therebehind.

Slidably mounted in slots in the plates 80 and 80*a* is a drive arm plate 81 which is bifurcated at its lower edge and to which stripper bars 82 and 82*a* are fixed. The stripper bars are of rectangular cross section and bar 82 projects into the slots 79 in the rear row of punches 78 and bar 82*a* projects into slots 79*a* in punches 78*a*.

Mounted upon the plate 71 is a punch retaining bar 83 which is of T-shape cross section, having a flangelike projection at its upper edges, which projects into the slots 79 and 79*a* in the punches 78 and 78*a*, thereby to limit upward travel of those punches.

Journaled between the front and back plates, at each end thereof, are shafts 84 and 84*a*, Fig. 4. Shaft 84 carries a sprocket 85 and shaft 84*a* carries a sprocket 85*a*, around which sprockets an endless chain 86 is threaded. Carried by the chain 86 are a plurality of punch selector pins 87, which pins are spaced uniformly apart and are arranged so that one of the pins, and only one, is registered with a punch. Shaft 84 also carries another sprocket 84*b*, Fig. 3, and shaft 84*a* carries a second sprocket 85*b*, Fig. 4, around which latter sprockets a second chain 86*a* is threaded, this second chain carrying punch selector pins 87*a*, spaced apart and arranged so that one of these pins, and only one, will be at all times registered with one of the punches 78*a* in the forward row.

Fixed upon a drive arm plate 81 are presser bars 88 and 89, which bars are of L-shape cross section and one arm of the bar 88 overhangs the pin 87 registered with the rear row of punches, and one arm of the bar 89 overhangs the corresponding pin 87*a* that is registered with the front row of punches.

As will be seen best in Fig. 4, the card marking punch 78*b* is located with its front edge in line with the front edges of the punches 78 in the rear row of punches. The bottom of punch 78*b* is triangular in shape and registers with the triangular perforation 53 in the bottom die plate 40*b*, Fig. 7. The punch 78*b* contains in its forward face a slot into which stripper bar 82 fits, so that downward movement of the stripper bar 82 operates punch 78*b* to cut away the corner of the card C.

Registered with the cam 75 is a link 90 which is connected at its upper end to drive arm plate 81 by a pivot 90*a*. It will be apparent that a rotation of the "punch" drive shaft 74 will move the drive arm plate 81 downwardly, thereby operating selected punches through the presser plates 88 and 89, and the punch selector pins 87 and 87*a*, with which those presser plates are in engagement. Punch 78*b* is also operated. Downward movement of the drive arm plate 81 lowers the stripper bars 82 and 82*a*, thereby to permit operation of the selected punches to perforate a card in the card chute 7. During the last half of the revolution of shaft 74, plate 81 is raised and with it stripper bars 82 and 82*a*, thereby to move the operated punches back into their normal positions in which they are shown in Figs. 3, 4 and 11.

Thus it will be seen that an operation of the punch unit perforates in a card in chute 7, three perforations corresponding respectively to selected punches 78 and 78a, and to punch 78b, thereby to mark the card as "punched in." A drawer 91, Fig. 4, mounted in the framework of the computer below the lower die plate 40b, catches and retains the slugs thus punched out of the card.

Mounted upon the "punch" drive shaft 74 is a cam 92 which operates a lever 93 by which a snap switch 94 is operated during the portion of the revolution that the lever 93 is in engagement with the dwell of the cam 92. Also mounted upon shaft 74 is a cam 95 engaged by lever 96 through which snap switch 97 is operated during the portion of the revolution of shaft 74 during which lever 96 is in engagement with the dwell of the cam 95. The purpose of switches 94 and 97 will be described in detail hereinafter.

Mounted upon the shaft 84 are Geneva gear plates 98 and 98a, that are fixed upon the shaft and rotated therewith. Loosely mounted upon the shaft 84 is a gear 99 through which Geneva gear 100 operates to step the hour chain 86 one step from each revolution of the minute chain sprocket 84b, as will hereinafter appear.

Mounted upon the base 70 of the "punch" unit is the solenoid 101, through operation of which the shaft 84 and instrumentalities driven thereby are driven step by step.

*Sensor unit*

As will be seen in Figs. 7, 12 and 13, the sensor unit 22 comprises a top plate 120 which extends across the card chute 7 and is spaced thereabove sufficiently to permit free movement of a card C between the top plate and the bottom plate 40a of the card chute. Plate 120 contains a slot 121 which registers with the row of perforations 46, Fig. 7, in the plate 40a and extends from end to end thereof. Plate 120 also contains a second slot 122 that registers with the row of perforations 47 in the plate 40a and extends from end to end thereof.

Upstanding from the right hand end of the plate 120, as viewed from the front of the computer, is a bracket 123 in which a shaft 124 is fixed. At the left hand end of the plate 120, a similar bracket 123a upstands from the plate and a shaft 124a is fixed therein.

Loosely mounted upon the shaft 124 is a gear 125 and a sprocket wheel 126 that is fixed with respect to the gear 125. Also mounted upon the shaft 124 is a slightly smaller gear 127, Fig. 3, and a sprocket 128 which is fixed with respect to the gear 127.

Shaft 124a carries a sprocket 126a, Figs. 4 and 12, and a second sprocket 128a, both of which are freely rotatable upon the shaft 124a.

Extending between the brackets 123 and 123a, and in substantial alignment with the sprockets 126 and 126a, is a guide rod 129 which, in the example shown, is of rectangular cross section. Also extending between these brackets is a second guide rod 129a, which is in substantial alignment with the sprockets 128 and 128a. Mounted upon the guide rod 129 is a generally rectangular block 130 which is freely slidable along the rod 129. Pivotally mounted upon block 130 is a sensor or feeler 131 that is urged in a counterclockwise direction, as seen in Fig. 12, about its pivot by a spring 132 carried by the block 130. A chain 133 is threaded around sprockets 126 and 126a and its ends are attached to opposite ends of the block 130. It will be apparent that upon rotation of the gear 125 and sprocket 126, in a clockwise direction, as seen in Fig. 12, block 130 will be moved along the guide rod 129, registering the sensor 131 with the slot 121, thereby to permit the spring 132 to rotate the sensor and bring its free end into engagement with the card C. When this movement has been carried on sufficiently to register the sensor 131 with a perforation previously punched in the card in row 46 therein, the sensor passes through that perforation and into engagement with the corresponding perforation in the bottom plate 40a in the manner shown in Fig. 13, thereby to prevent further movement of the block 130 in the assumed direction. It will be noted that the engagement of the sensor 131 with the plate 40a removes strain from the card C.

A similar chain 133a, Figs. 3 and 4, is threaded around sprockets 128 and 128a and attached to a block 130a, not shown, that is slidably mounted upon the guide rod 129a. This guide block carries a sensor similar to 131, which registers with the slot 122 and upon movement of the block along the guide rod into registration with a perforation in the card C, which perforation is located in the front row 47 of perforations. The sensor then projects through the perforation in the card C and into the corresponding perforation in the plate 40a.

*Print unit*

Figures 14, 14A:
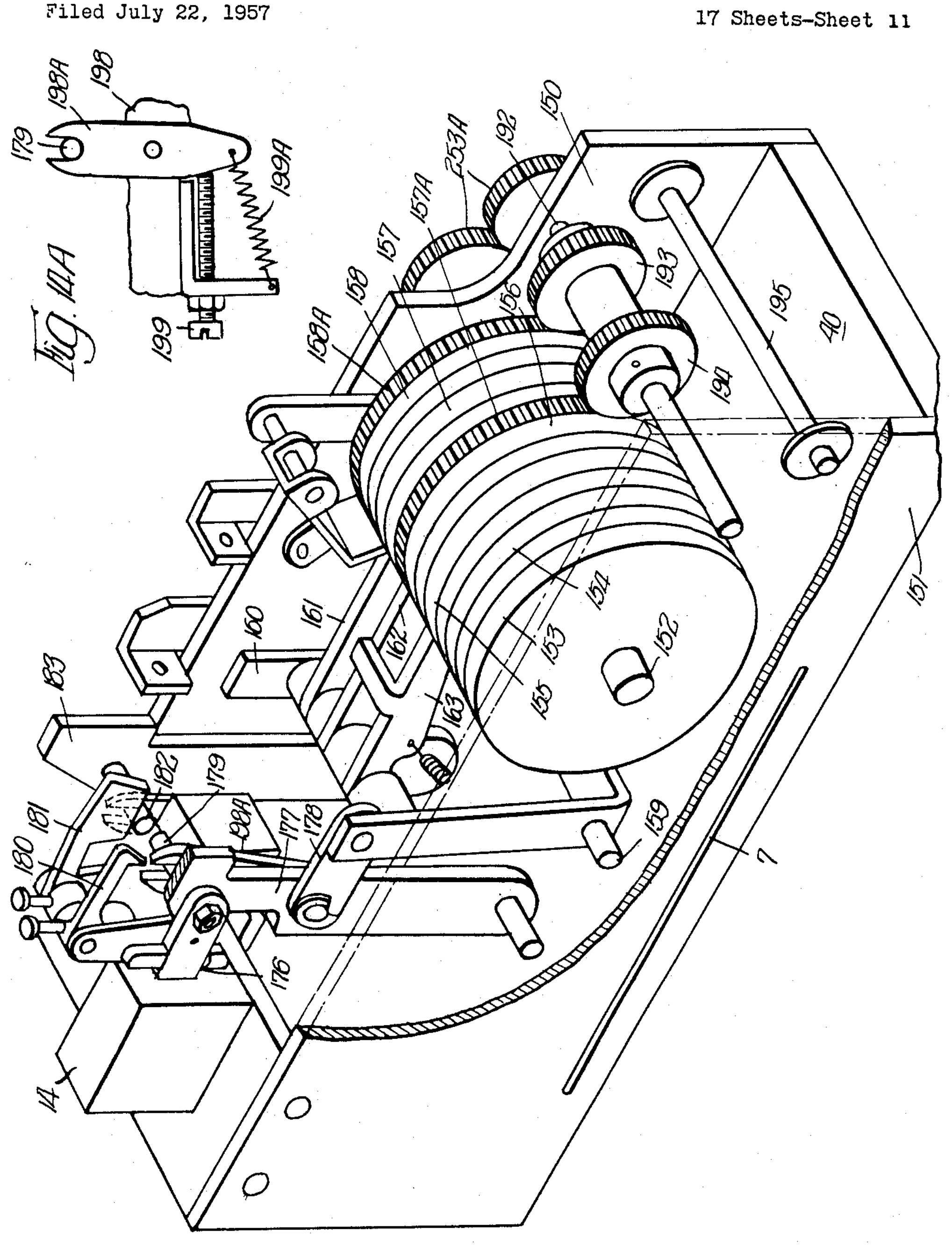
Fig. 14 is a perspective view of the print unit with the front plate partially broken away and with the clock mechanism removed.
Fig. 14A is a fragmentary detailed view of the time step armature adjustment stop.
Figure 15:
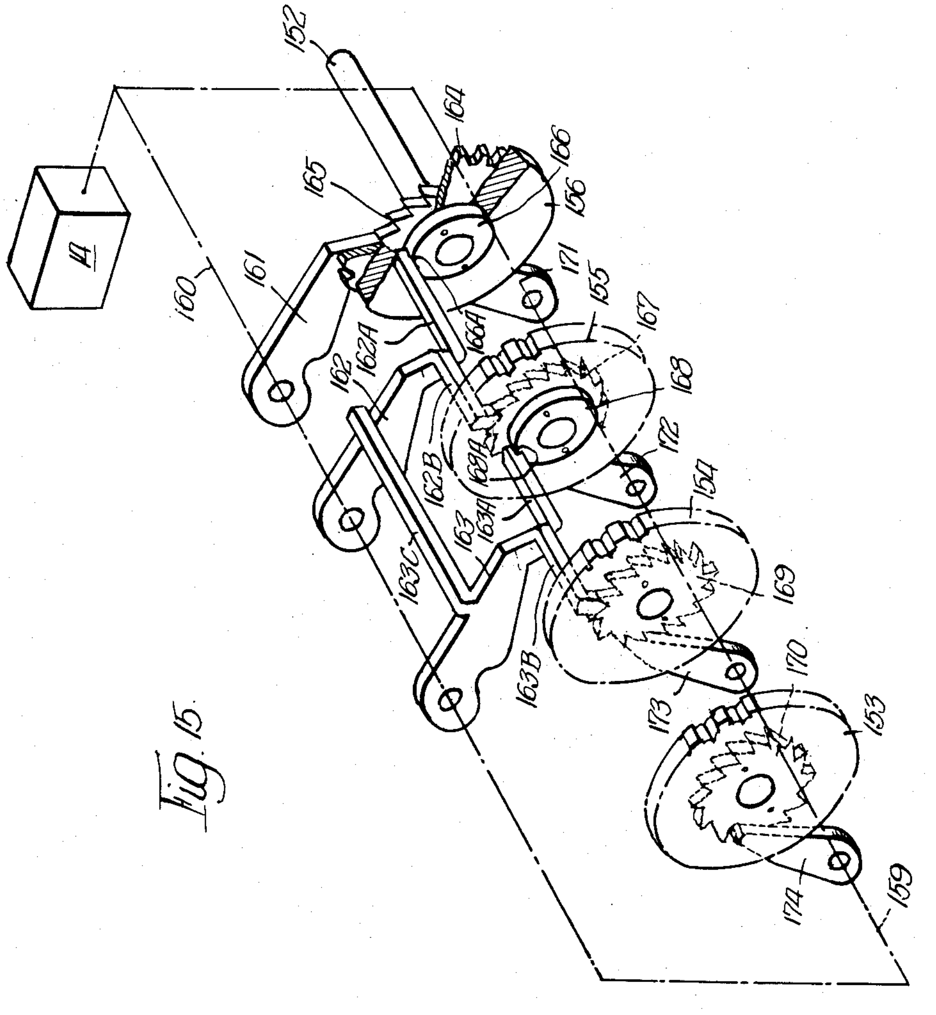
Fig. 15 is a diagrammatic view of the time of day print wheel stepping mechanism.

Print unit 20, located at the front of the computer, is shown in Figs. 14 and 15. The base plate of this unit, which is plate 40, Fig. 7, carries an upstanding rear wall 150 and an upstanding front wall 151 which forms a part of the front wall 8 of the computer, which is partially broken away in Fig. 14 so as not to conceal parts disposed behind it. Journaled in walls 150 and 151 is a shaft 152 upon which are loosely mounted a month print wheel 153, a day print wheel 154, an hour print wheel 155, and a minute print wheel 156, all of which are employed to print the time of day. Shaft 152 also carries an elapsed time hour print wheel 157 and an elapsed time minute print wheel 158, omitted in Fig. 15.

Journaled in the front and back plates 150 and 151 is a second shaft 159 which supports a stirrup-like rack 160. Pivotally mounted in the top of rack 160 is a minute pawl 161, an hour pawl 162, and a day pawl 163.

As will be seen best in Fig. 15, a gear wheel 164, a ratchet gear 164, and a carry disk 166 are rotatably mounted upon the shaft 152 and fixed with respect to the minute wheel 156 as by screws or rivets. A ratchet 167 and carry disk 168 are similarly rotatably mounted upon shaft 152 and fixed with respect to the hour type wheel 155. A ratchet 169 is fixed with respect to the day type wheel 154 and a ratchet 170 is fixed with respect to the month type wheel 153.

The minute pawl 161 engages the ratchet 165, and a retaining pawl 171 that is pivotally mounted upon the shaft 159 also engages ratchet 165.

Hour pawl 162 has a branch 162a which engages the transfer disk 166, and a second branch 162b engages the ratchet 167. A retaining pawl 172 also engages ratchet 167.

The day pawl 163 contains a branch 163a which engages the transfer disk 168 and a branch 163b which engages the ratchet 169 as does a retaining pawl 173.

A retaining pawl 174 engages the ratchet 170.

Mounted upon a platform that extends between the front and back walls 150 and 151 of the print unit is a time of day solenoid 14, the armature 176 of which is connected to a lever 177 that is pivotally mounted between the front and back walls of the unit. A unit 178 connects the lever 177 to the rack 160. It will be apparent that an energization of the solenoid 14 will move the rack counterclockwise, as seen in Fig. 14, against the tension of spring 197, Fig. 16, thereby to withdraw the pawls 161, 162 and 163 from the ratchet teeth with which they are then engaged. From Fig. 15, it will be seen that the transfer disk 166 contains a valley 166a into which the arm 162a drops when the disk is in the position shown in Fig. 15. This permits the arm 162b to drop into engagement with a tooth in the ratchet 167 so that upon de-energization of the solenoid 14, hour wheel 155 and minute wheel 156 will be advanced one step, coming to rest in the position in which they are shown in Fig. 15.

Carry disk 168 contains a similar valley 168a into which arm 163a drops, permitting the arm 163b to engage the ratchet 169 so that as the solenoid 14 de-energizes, the day type wheel 154 will also be moved one step.

Upon the next energization of the solenoid 14, arm 162a and arm 163a will be elevated onto the dwell portions of the carry disks 166 and 168, respectively, and therefore arms 162b and 163b will be elevated out of engagement with their respective ratchets. Pawl 161 will advance the minute wheel upon de-energization of the solenoid, but the hour and day wheels will not be advanced.

In the embodiments of the computer shown by way of example, the minute print wheel 156 must take twenty steps to one step of the hour wheel 155, and the hour wheel must take twenty-four steps to one step of the day wheel 154. Since during the twenty steps succeeding the step which brought the apparatus into the position shown in Fig. 15 the hour wheel and carry disk 168 will not be moved, we have provided a third arm 163c on the pawl 163, which arm overhangs the pawl 162. Carry disk 166 being in such position during these twenty steps that the arm 162a is always registered with the dwell on the disk 166, pawls 162 and 163 will be maintained elevated out of engagement with their respective ratchets during these twenty steps.

From the foregoing it will be apparent that operation of the solenoid 14 operates the minute print wheel 156, the hour print wheel 155, and the day print wheel 154. The month print wheel 153 is not advanced through operation of this solenoid, but rather must be advanced manually at the beginning of each month.

*Lockout of time advance during operating cycle of computer*

Lever 177, Fig. 14, carries a pin 179 which normally passes beneath a latch 180 that is pivotally mounted upon a bracket on the frame of the print unit. Pivoted co-axially with the latch 180 is an interlock bar 181 that is normally held in elevated position by a pin 182 carried by a lever 183 of the card hold mechanism.

As will hereinafter appear, card hold mechanism is operated upon each cycle of the computer, and lever 183 is moved to the left, as seen in Fig. 14, thereby to move pin 182 to the left to permit the interlock bar 181 to drop below the position in which it is shown. Latch 180 also is dropped and should the solenoid 14 be operated while the card hold lever is in this latter position, latch 180 will engage the pin 179, thereby to hold the armature of the solenoid 14 and the pawls 161, 162 and 163 in operated position so long as the lever 183 remains in its operated position. Through this arrangement, stepping of the time of day print wheels during a cycling operation of the computer is definitely prevented, even though the circuit of solenoid 14 is opened, since the armature of this solenoid is mechanically locked in operated position.

*Clock step mechanism*

Figures 16, 22:
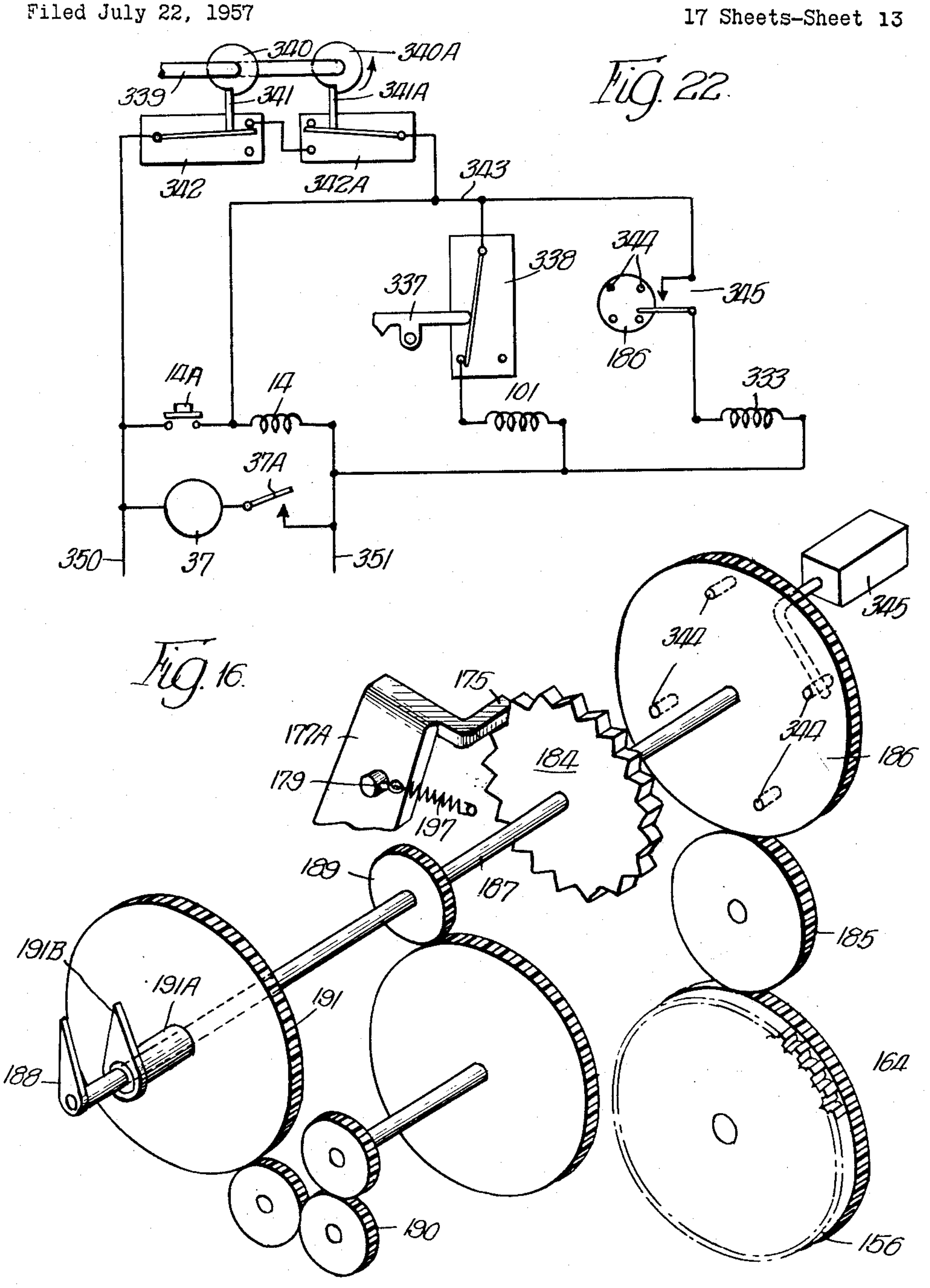
Fig. 16 is a diagrammatic view of the clockwork gear mechanism.
Fig. 22 is a schematic diagram of the time pulse circuits of the computer.

As will be seen in Fig. 16, a gear 185 is meshed with a gear 164 that is moved one step each time the print wheel 156 is stepped. Gear 185 meshes with a minute gear 186 of the clockwork mechanism, which gear is fixed upon the shaft 187 upon which the minute hand 188 of the clock 3 is fixed. Through this arrangement the minute hand 188 is stepped one step each time the print wheel 156 is stepped one step, and in the computer shown by way of example such stepping of the minute hand indicates the passing of an interval of three minutes. Fixed upon shaft 187 is a gear 189 that is part of a gear train, indicated generally at 190, that meshes with an hour gear 191 that is rotatably mounted upon the shaft 187 and carries a sleeve 191a upon which the hour hand 191b of the clock is fixed. Through this arrangement, the hour hand steps one-twelfth of a revolution for each revolution of the shaft 187 and minute hand 188.

In Fig. 14, lever 177 is shown broken away at its upper end. In Fig. 16, the broken end 177a is shown. Shaft 187 of the clockwork mechanism carries a star wheel 184 and an extension 175 of lever 177a projects into the path of that star wheel. When magnet 14 is de-energized, a spring 197 that is connected to the pin 179 carried by the lever 177, restores the armature of the solenoid to normal, thereby moving the extension 175 into engagement with the teeth of ratchet 184. This locks the clockwork against movement.

Pivotally mounted upon a block 198, Fig. 14A, is a yoke 198a that contains a slot at its upper end, into which pin 179 projects. Mounted in a suitable bracket upon the block 198 is an adjusting screw 199 which engages the yoke 198a. A spring 199a rotates the yoke clockwise about its pivot and into engagement with the adjusting screw 199.

When spring 197 restores the armature of time of day solenoid 14 and the lever 177 to normal position, pin 179 rotates yoke 198a clockwise about its pivot. This movement of lever 177 also rotates the stirrup 160 around its pivot to drive the pawls 161, 162, and 163 forwardly, thereby to advance the time of day print wheels one step. Engagement of the yoke 198a with the adjusting screw 199 limits this forward movement of the pawls. Screw 199 can be adjusted so as to set this limits position of the yoke 198a properly to maintain the print wheels aligned in desired position. A suitable locknut on the adjusting screw 199 maintains the adjustment fixed as set.

Figure 18:
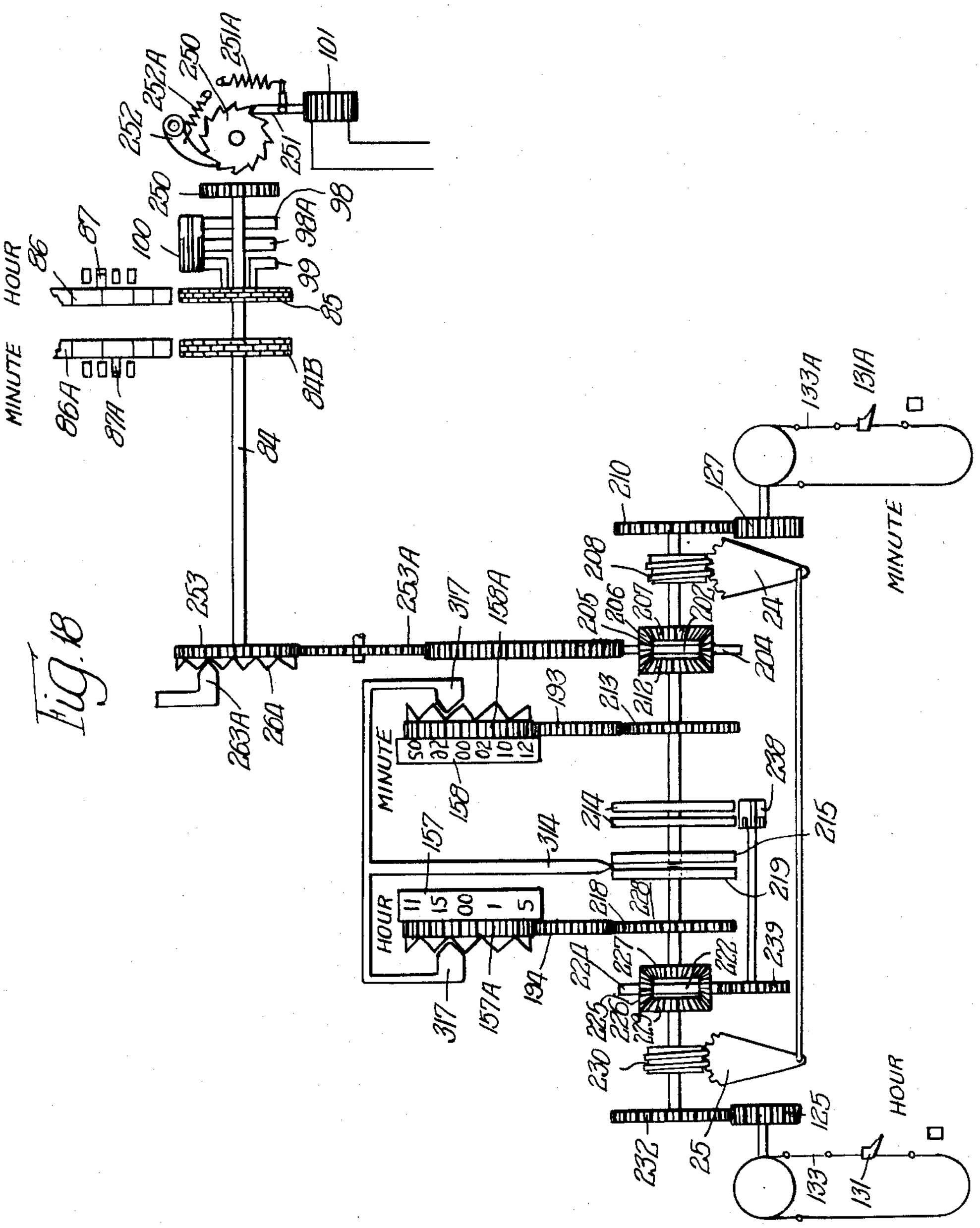
Fig. 18 is a diagrammatic view of the elapsed time stepping and computing mechanisms.

Fixed with respect to the elapsed time hour print wheel 157 is a gear 157a, best seen in Fig. 18, and fixed with respect to the elapsed time minute wheel 158 is a gear 158a. Extending between the back wall 150 and front wall 151 of the print unit, Fig. 14, is a shaft 192 upon which a gear 193 is rotatably mounted. Gear 193 meshes with gear 158a. Also rotatably mounted upon shaft 192 is a gear 194 that meshes with gear 157a. Suitable collars on shaft 192 maintain gears 193 and 194 properly positioned axially along the shaft. Gears 193 and 194 operate to drive the minute and hour elapsed time print wheels, as will presently appear. Journaled in the front and back walls of the print unit is a roll 195 around which an inked ribbon is threaded, as will presently appear.

*Differential unit*

The elapsed time minutes print wheel 158 is connected to the punch unit 21 through a differential mechanism 19, Fig. 6, that is shown in Fig. 17 in quarter section, drawn to an enlarged scale. The differential unit is carried upon a shaft 200 that is non-rotatably mounted in suitable brackets carried upon the framework of the computer. Rotatably mounted upon the shaft 200 is a sleeve 201, at the center of which a minutes differential cage 202 is fixed. The differential cage 202 includes a disk 203 and a gear 204, both of which are formed as integral parts of the cage and are spaced apart as shown. Journaled upon suitable shafts extending between the disk 203 and gear 204 are pinions 205 and 206 which are meshed together at the center of the cage. The cage carries two pairs of such pinions.

Rotatably mounted upon the sleeve 201 is a gear 207 which projects through an opening in the cage and is meshed with the pinions 206 therein. An extension of the hub of the gear 207 carries a pinion gear 208 with which the segment 24 is meshed. This hub also carries a gear 210, and the pinion 208 and gear 210 are fixed to the gear 207 in convenient manner, such as by rivets 211.

The other end of the sleeve 201 carries a similar gear 212 which projects into the cage and meshes with the pinions 205 therein. Carried upon the hub of the gear 212 is a gear 213, a pair of Geneva gear disks 214, and a star wheel 215. The gear 213, the disk 214, and the star wheel 215 are fixed to the gear 212 in a convenient manner, such as by rivets 216, there being suitable spacing collars interposed between these members to space them in desired position relative to each other.

Shaft 200 also carries a bushing 217 that is rotatably mounted thereupon and upon which a gear 218 and a star wheel 219 are fixed as by rivets 220, with suitable spacing collars interposed between the members to secure proper spacing thereof.

Shaft 200 carries a second sleeve 221 rotatably supported thereon and upon which an hour differential cage 222 is fixed, this cage comprising a disk 223 and a gear 224, both of which are formed as integral parts of the cage and are spaced apart as shown.

Journaled upon suitable shafts extending between the gear 224 and disk 223 are a pair of pinions 225 and 226 which are meshed together at the center of the cage, there being two such pairs of pinions in the cage.

Rotatably mounted upon the sleeve 221 is a gear 227 which projects through an opening in the cage 222 and is meshed with the pinions 226. Fixed upon the hublike portion of the gear 227 is the hub of a gear 228.

Sleeve 221 also carries a gear 229 that is rotatable upon the sleeve and projects through an opening in the cage 222 and is meshed with the pinions 225. Fixed upon the hublike portion of the gear 229 is a pinion 230 with which segment 25 is meshed, and a gear 232, which gear and pinion are fixed with respect to the gear 229 by rivets 233.

Journaled in suitable journals supported by the framework of the computer is a shaft 234 upon which a pinion 235 is fixed, this pinion being meshed with the gear 218. Also fixed upon the shaft 234 is a pinion 236 that is meshed with the gear 228. A second shaft 237 is journaled in suitable brackets on the framework, and at one end carries a Geneva gear 238 that engages the Geneva disks 214. Fixed upon the other end of the shaft 237 is a pinion 239 that is meshed with the gear 224 of the hour differential cage 222.

*Elapsed time stepping train*

In Fig. 18, we have shown in somewhat diagrammatic form the stepping train by which the elapse of time is registered in the mechanism. The shaft 84 of the punch unit, Fig. 11, carries a ratchet gear 250 that is hidden from view in Fig. 11. Solenoid 101 has an armature which carries a pawl 251 that is pressed by spring **251*a* into engagement with the teeth of gear 250. A retaining pawl 252 is pressed by spring 252*a* into engagement with these teeth. Through this arrangement each operation of the solenoid 101 withdraws the pawl 251, and when the solenoid deenergizes, spring 251*a* advances the pawl 251, thereby to rotate the ratchet gear 250 and shaft 84 one step. The punch selector pin 87*a*, carried upon the chain 86*a*, is thus advanced one step through the operation of the sprocket 84*b* that is fixed upon shaft 84**.

As previously pointed out, there are twenty punches in the row with which the punch selector pin **87*a* on chain 86*a* is registered. The chain carries a plurality of pins such as 87*a*, which are spaced twenty steps apart. As the pin 87*a* moves out of registration with the last punch in the row, the succeeding pin, such as 87*a***, simultaneously moves into registration with the first punch in the row.

Simultaneously with this step, Geneva disks 98 and **98*a* move Geneva gear 100 one step, thereby to rotate gear 99 and sprocket 85, fixed thereto, through one step to advance the chain 86 and selector pin 87** one step, indicating the passage of an hour.

Shaft 84 carries a gear 253 which is connected to the gear 204 of the minutes differential unit cage 202 by a gear train, indicated generally at **253*a*. Through this arrangement one step rotation of the shaft 84 will produce corresponding rotation of the differential cage 202. Gears 205 and 206, diagrammatically shown as bevel gears in Fig. 18, are meshed with gears 207 and gear 212, as previously pointed out. Pinion 208, with which segment 24 is meshed, is now held stationary by the segment, and as a result movement of the cage 202 operates gear 212 to which gear 213 is fixed. Gear 213 meshes with gear 193 of the print unit, Fig. 14, which gear 193 is meshed with the gear 158*a* that is fixed to the minutes print wheel 158. Through this gear train, the minute print wheel is advanced one step each time the solenoid 101** operates through one step.

Geneva disks 214 are rotated in unison with gears 212 and 213, and when these gears have stepped far enough to move the print wheel 158 from its nineteenth to its twentieth position, disk 214 operates Geneva gear 238, thereby to rotate gear 239 which is meshed with the gear 224 that forms a part of the cage 222 of the hour differential. Pinions 225 and 226, diagrammatically shown in Fig. 18 as bevel gears, are meshed with gear 229 that is fixed with respect to pinion 230 with which segment 25 is meshed. Gear 229 is held against rotation by segment 25; pinions 225 and 226 therefore drive gear 227 and gear 228 which move in unison therewith. Gear 228 is connected to the print unit through pinions 235 and 236, shaft 234, gear 218, and gear 194 that is meshed with gear 157a that is fixed with respect to the hour print wheel 157. Through this arrangement, as the minute print wheel 158 moves from its nineteenth to its twentieth position the hour print wheel 157 will be advanced one step, thereby to indicate the passage of an hour.

Figure 19:
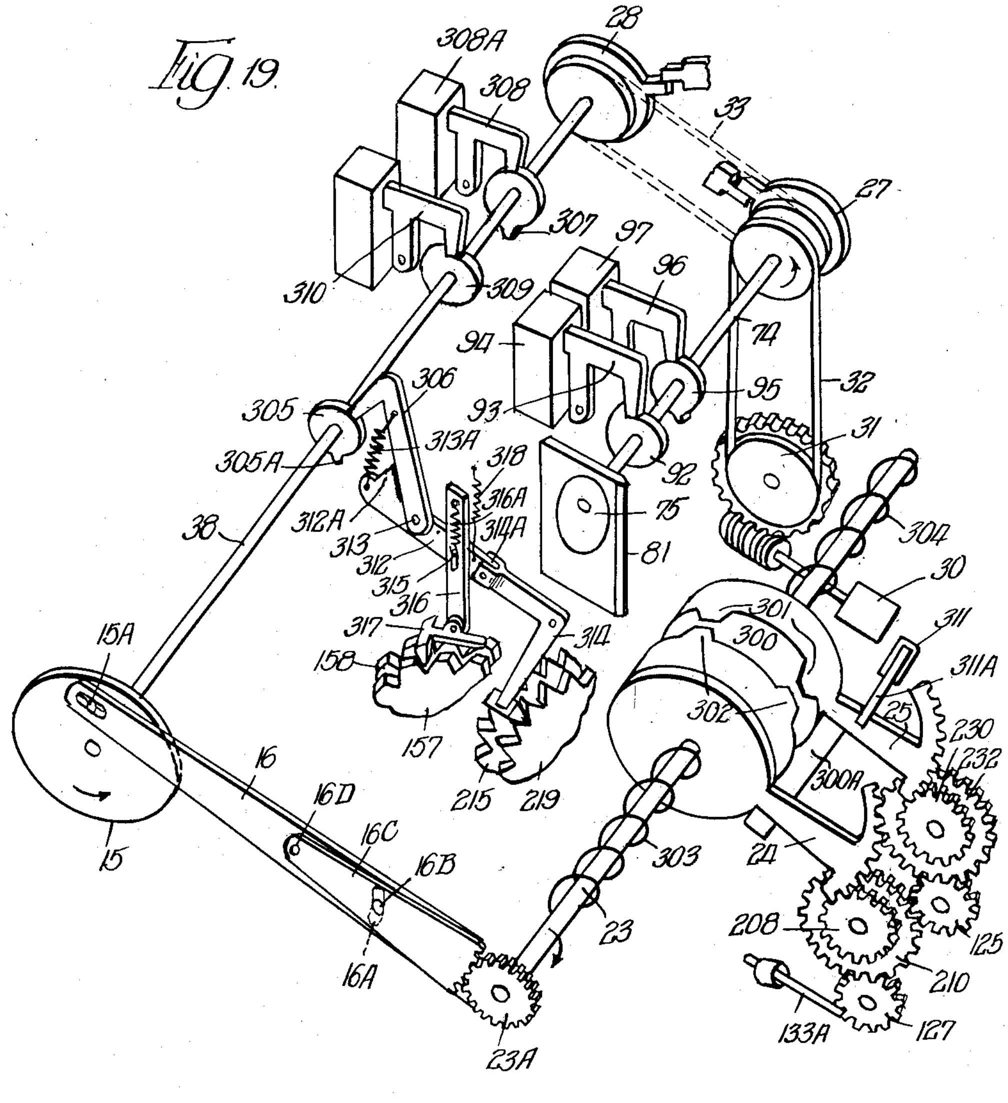
Fig. 19 is a diagrammatic view of the power drive of the computer.

Gear 210, which is fixed with respect to pinion 208 and gear 207, meshes with gear 127, Figs. 3 and 19, of the minute sensing unit for the purpose of coupling the minute differential assembly centered upon cage 202 to the minute sensing chain **133*a*. Gear 232, which is fixed with respect to pinion 230 and gear 229, meshes with gear 125 of the sensing unit, Figs. 3 and 19, thereby to couple the hour differential assembly centered upon cage 222 to the hour sensing chain 133**. The purpose of these couplings will be hereinafter explained.

*Single revolution clutch structure*

As will be seen in Fig. 5, a single revolution clutch 27 connects power to the drive shaft 74 of the punch unit 21, and a single revolution clutch 28 connects power to the drive shaft 38 of the "computer" unit. Clutches 27 and 28 are of identical construction and clutch 28 is illustrated by way of example in Figs. 20, 20*a* and 20*b*. As will be seen in these figures, the clutch consists of a plate 280, the hub of which is pinned to the shaft 38 in the manner shown in Fig. 20*b*. A lug 285 projects outwardly from plate 280. Pivotally mounted upon the plate 280 is a pawl 281 to which a spring is attached and tensioned to rotate the pawl clockwise about its pivot. Extending from the pawl 281 is an arm **281*a* which projects beyond the periphery of disk 280. Loosely mounted upon the shaft 38 is a toothed clutch 282 that is fixed with respect to the sprocket 283**.

Figures 20, 20A:
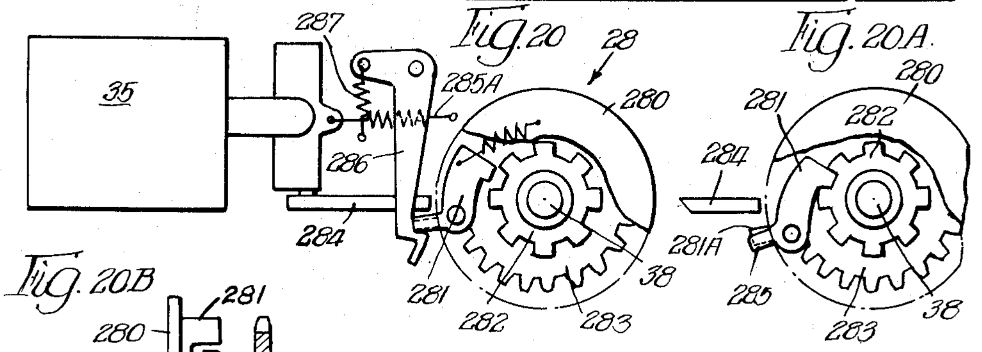
Fig. 20 is an elevational view of the "out" clutch mechanism in normal position.
Fig. 20A is a fragmentary elevational view of the "out" clutch mechanism in engaging position.
Figure 20B:
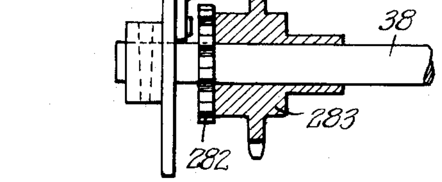
Fig. 20B is a side elevational view, partly in section, of the "out" clutch mechanism.

The armature of "computer" clutch solenoid 35 is connected to a stop plate 284 that lies in the path of lug 285 and the arm **281*a* when the solenoid is de-energized. A spring 285*a* moves the armature of solenoid 35 and the stop plate 284** to the right, as seen in Fig. 20, thereby to fix the home position of the clutch.

When the solenoid 35 is operated, stop plate 284 is moved out of the path of the lug 285 and the arm **281*a*, thereby freeing the pawl 281 which is rotated by its spring into engagement with the teeth of the toothed clutch 282. Power is thus connected to the drive shaft 38** to rotate it.

Before the shaft 38 has thus been driven through a single revolution, solenoid 35 will de-energize, as hereinafter explained, and spring **285*a* will move stop plate 284 into the path of lug 285 and arm 281*a***.

At the end of the single revolution of the plate 280, arm **281*a* engages the stop plate 284 and then lug 285 engages that plate. Engagement of the arm 281*a* with the stop plate rotates pawl 281 counterclockwise about its pivot, thereby to disengage the pawl from the toothed clutch plate 282. Engagement of the lug 285 with the stop plate brings the disk 280** to rest.

Pivotally mounted upon the framework of the computer is a non-reverse latch 286, the lower end of which is engaged by the arm 281a and lug 285 to rotate the latch around its pivot and against the tension of its spring 287. After the arm and lug have passed the lower edge of the latch 286 and moved into engagement with the stop plate 284, spring 287 rotates the latch to move its lower end into engagement with the lower surface of the lug and arm, thereby to prevent a reverse movement of the disk 280.

"Punch" clutch 27 is of construction identical with that of clutch 28, and description thereof would be a needless repetition.

*Power drive of computer*

Fig. 19 of the drawings diagrammatically illustrates the power drive of the computer. When viewed with Fig. 5, it will be seen that upon operation of the computer through a "punch in" cycle, power from motor 30 will be transmitted through the speed reduction gear 31 and chain 32 to the single revolution clutch 27 which is operated to connect that power to the drive shaft 74 of the punch unit, operating that shaft and instrumentalities actuated thereby to "punch in" the card in the manner hereinbefore explained. During a "punch out" cycle, power from chain 32 is transmitted through chain 33 to the "computer" single revolution clutch 28 that is operated to connect that power to the shaft 38, thereby to rotate that shaft through a single revolution.

As will be seen in Figs. 2 and 19, a disk 15 is fixed on the front end of shaft 38 and carries a pin 15a which rides in a slot in the lever 16. Lever 16 is pivoted on the axis of shaft 23 and contains a slot 16a through which is extended a rod 16b that is fixed on the front plate of the computer framework and upon which a link 16c is pivotally mounted. A pin 16d carried by the lever 16 projects into a slot in the link 16c. Fixed upon shaft 23 is a gear 23a with which teeth upon the link 16c are meshed.

Power applied to the shaft 38 rotates that shaft in a counterclockwise direction, moving the pin 15a, thereby to rotate the lever 16 in a counterclockwise direction around the axis of shaft 23. Pin 16d drives the link 16c in a counterclockwise direction around its pivot 16b, thereby to rotate the gear 23a and the shaft 23 in a clockwise direction.

Fixed upon the shaft 23 is a clutch plate 300, into the two faces of which grooves 301 and 302 are indented. Preferably clutch plate 300 contains three such grooves located 120° apart.

Minutes drive sector 24 is loosely mounted upon the shaft 23 and the hub of this sector contains projections which register in grooves 302 in the clutch plate 300. A spring 303 is coiled around shaft 23 and presses the hub of the segment 24 into engagement with the clutch plate. Segment 25 is similarly mounted and the hub of this segment contains projections which register in grooves 301 in the clutch. A spring 304 coiled around the shaft 23 presses the hub of segment 25 into engagement with the clutch plate 300.

Rotation of shaft 23 in a clockwise direction moves segments 24 and 25 clockwise. Segment 24, which is meshed with the pinion 208 of the minutes differential unit, drives gear 210 of that unit and, through gear 127 of the sensing unit that is meshed with gear 210, drives the minutes sensing chain 133a, Figs. 3 and 4, thereby to move the block and sensor carried thereby into registration with the slot 122, Fig. 12, and the card C that is in chute 7 in search of the perforation in the card that indicates the position of the computer mechanism when the card was "punched in." As soon as this perforation in the card is found, the sensor is moved through it and into registration with the corresponding perforation in plate 40a in the manner illustrated in Fig. 13, in connection with the hour sensor, thereby to prevent further movement of the chain 133a. Movement of the segment 24 being thus blocked, the hub of this segment is moved forwardly of the computer by engagement of the sloping surfaces of the projections on the segment hub with the sloping surfaces of the slots 302 in plate 300, thereby to permit further rotation of the clutch plate 300. Spring 303 is further compressed by this movement of the segment 24.

Simultaneously with the movement of segment 24, segment 25 is rotated in a clockwise direction and through gear 230, with which segment 25 is meshed, drives gear 232 which is meshed with gear 125, thereby to move hour chain 133 and the block 130 carried thereby to the left, as seen in Fig. 12, thereby to register the sensor 131 with the slot 121 and to move that sensor in this slot in search of the hour perforation punched in the card C to indicate the hour position of the computer at the time the card was "punched in." When this perforation is located, the sensor 131 is moved through it into registration with the corresponding perforation in plate 40a, as shown in Fig. 13, thereby to prevent further movement of the chain 133, and the hub of segment 25 is moved out of engagement with the projections 301 on the clutch plate 300 and against the tension of spring 304.

Mounted upon the back of the front plate of the computer is a lever 312 that is pivoted at 313 and urged counterclockwise thereabout by spring 318. Lever 306 is also pivoted at 313 and held against a boss 312a on the lever 312 by a spring 313a.

Also pivoted on this back of the front plate is a centering lever 314 which is hingedly connected to lever 312 at 314a.

Shaft 38 carries a cam 305 the dwell 305a of which moves into engagement with the lever 306 when the shaft has made approximately one-half of a revolution. Levers 306 and 312 are thus rotated in a clockwise direction around pivot 313 and through the connection 314a centering lever 314 is rotated in a counterclockwise direction around its pivot.

As will be seen in Fig. 17, star wheels 215 and 219 of the differential unit are located adjacent to each other, and centering lever 314 is moved into engagement with the teeth of these star wheels by this rotation in a counterclockwise direction.

It will be noted that lever 306 is held against the boss 312a by a spring 313a. Should the centering lever 314 fail to properly register with the teeth of the star wheels 215 and 219, or either of them, further rotation of levers 312 and 314 will thus be blocked. Lever 306 is free to rotate around the pivot 313 against the tension of spring 313a. Through this arrangement damage to the linkage and star wheels is prevented, even though misalignment occurs.

Lever 312 carries a pin 315 which projects through a slot in lever 316, there being a spring 316a connected between the lever 316 and the pin 315. Lever 316 carries a centering pawl 317 which registers with the grooves in type wheels 158 and 157. Rotation of lever 312 around its pivot forces lever 316 downwardly, thereby to engage the centering pawl 317 with these grooves to maintain the print wheels in proper alignment. Should pawl 317 fail to register properly with these grooves, pin 315 moves in the slot in lever 316 against the tension of spring 316a and damage to the pawl and type wheels is thus prevented.

Shaft 38 also carries a cam 307 the dwell of which moves into engagement with the lever 308 while the dwell 305a of cam 305 is holding the centering linkage in engagement with the various star wheels and print wheels as above. Operation of lever 308 operates switch 308a, thereby to close a circuit to the printing solenoids of the computer to effect a printing operation, as will presently appear. Shaft 38 also carries another cam 309 which moves its dwell into engagement with the lever 310 shortly after the revolution of the shaft begins.

thereby to operate switch 310*a* to close an auxiliary circuit for the motor, as will presently appear.

Lever 308 drops into the valley of cam 307 at the end of the printing operation, thereby to open switch 308*a* to permit the solenoid to restore. After shaft 38 has moved through a few more degrees, the dwell 305*a* of cam 305 moves out of engagement with lever 306, thereby to permit spring 318 to rotate levers 312 and 306 counterclockwise around the pivot 313 and to rotate lever 314 clockwise around its pivot. Lever 314 is thus disengaged from the star wheels 215 and 219 and centering pawl 317 is disengaged from the print wheels 157 and 158 by the upward movement of lever 316.

During the last half of the single revolution of shaft 38, pin 15*a* is moved upwardly, thereby to move lever 16 and link 16*c* in clockwise direction thereby to rotate gear 23*a* and shaft 23 in counterclockwise direction. This rotation of clutch plate 300 brings the grooves 301 and 302 thereon into registration with the corresponding projections on the hubs of segments 24 and 25, and springs 303 and 304 move those segments axially of the shaft to re-register the segments with the clutch plate 300. Fixed to the clutch plate 300 is a block 300*a*, which moves into engagement with the lower edges of segments 24 and 25 simultaneously with the registration of grooves 301 and 302 with the projections on the segments. Further movement of the shaft operates segments 24 and 25 in a counterclockwise direction, thereby to restore the chains 133 and 133*a* of the sensor unit to normal position. Block 300*a* insures positive return of the segments to normal position, even though grooves 301 and 302 do not properly register with the projections on the hubs of the segments or the projections slip out of those grooves during this reverse movement. Further movement of the shaft and segments operates the chains 133 and 133*a* into a reverse direction to restore the sensor unit to normal.

*Computing elapsed time*

Inasmuch as the print wheels 157 and 158 have been advanced step by step with the passage of intervals of working time between "punch in" and "punch out," these print wheels at the beginning of a "punch out" cycle will be in the position corresponding to the positions of the punch selector pins 87 and 87*a*.

Rotation of the shaft 23 and consequent movement of the segment 24 during the first half of the revolution of the "computer" shaft 38, in addition to driving the sensing chain 133*a* forwardly in search of the minutes "punch in" perforation in the card, also drives gear 207, Fig. 17, which is meshed with pinions 206 in the differential cage 202. The differential cage 202 now being locked by the engagement of the locking lever 263 with star wheel 264 on shaft 84, Fig. 8, as hereinbefore described, is immovable and consequently pinions 206 rotate, thereby to drive pinions 205 which are meshed with the gear 212 to which gear 213 is fixed. As will be seen in Fig. 18, gear 213 is connected through gear 193 to minutes print wheel 158, through gear 158*a*. This movement of the gear 213 drives the print wheel in a reverse direction, stepping it backwards from the position occupied at the beginning of the "punch out" cycle. Since the sensor on chain 133*a* has to move a number of steps to bring it from zero into the position occupied by the "punch" unit and print wheel at "punch in" time, print wheel 158 will be backed up a corresponding number of steps. When the sensor thus moved finds the minutes perforation in the card, it and the print wheel are brought to rest and the print wheel will thus be set in position to print the minutes of elapsed time.

Simultaneously with this movement of the minutes sensor, the hour segment 25 is moving the hour sensor in search of the hour punch mark and through gear 230 drives the gear 229 which is meshed with the pinions 225 in the hour differential unit centered on cage 222. The cage 222 now being locked, through pinion 239, shaft

237 and Geneva gear 238, pinions 225 and 226 are rotated to rotate the gear 227 and gear 228 fixed thereto. This rotation of gear 228 rotates pinions 235 and 236 which are fixed on shaft 234, Fig. 17, thereby to rotate gear 218. Gear 218 being connected through gear 194, Fig. 18, to hour print wheel 157, through gear 157*a* steps the hour print wheel backwards a number of steps corresponding to the number of steps which the sensor 131 must take to move into registration with the hour punch mark in the card.

The operation of the elapsed time computing mechanism will best be understood by a specific example. Assume first that the hour punch sector pin 87 and the hour print wheel 157 were in their respective third positions at the moment that a particular card was "punched in" by the computer. The print wheel 157 would then be in position to print three hours. Assume further that the minutes punch selector pin 87*a* and the minutes print wheel 158 were in their fifth positions at the moment that the assumed card was "punched in," in which case the minutes print wheel in the computer shown by way of example would be in position to print fifteen minutes or .25 of an hour. These elapsed time figures 3.25 do not appear on the card C, since the elapsed time hammer 17 is not operated during a "punch in" cycle. Assume further that one and one-half hours of working time elapsed between "punch in" and "punch out" of this card. The computer is arranged to step the minutes punch selector pin and the minutes print wheel one step every three minutes of elapsed working time. Thus during the one and one-half hour period assumed, the punch selector and minutes wheel will have been operated through thirty steps.

As the punch selector pin 87*a* moves from its nineteenth to its twentieth position, the associated Geneva movement moves the hour punch selector pin 87 forward one step. As the minutes print wheel 158 moves from its nineteenth to its twentieth position, the Geneva movement of the differential unit will move the hour print wheel 157 forward one step. As a result, at the start of the "punch out" cycle, the hour print wheel is set to print four hours and the minutes print wheel is set to print forty-five minutes or .75 of an hour. Segment 25 operates the hour sensor 133 through three steps before that sensor registers with the hour perforation punched in th card at "punch in." Simultaneously the hour print wheel 157 is backed up through three steps and since it was in its fourth step position at the start of this operation it comes to rest in its first step position, in which position it is set to print one hour. Simultaneously segment 24 operates the minutes sensor and the minutes print wheel through five steps to register the sensor 131*a* with the minutes perforation punched in the card at "punch in." The minutes print wheel stepping back five steps subtracts fifteen minutes or .25 of an hour, and since the print wheel was in position to print .75 of an hour at the beginning of the operation, it comes to rest in position to print .50 of an hour. Thus when the card is struck against the print wheels by an operation of elapsed time hammer 17, elapsed time of 1.50 hours will be printed on the card, that being the elapsed working time of one and one-half hours in the example under consideration.

As previously pointed out, the during the advance movement of the print wheel and Geneva mechanism 214 through transfer position, Geneva gear 238 is operated by disk 214 to advance the hour differential cage 222 one step, thereby to advance the hour print wheel one step simultaneously with the movement of the minutes print wheel from its nineteenth to its twentieth position. During an elapsed time computing cycle the minute print wheel and Geneva disk 214 are moved in a reverse direction, and when the disk 214 moves through transfer position Geneva gear 238 is operated in a reverse direction, thereby to back up the hour differential cage 222 one step. Should this operation of the Geneva gear occur after the hour sensor chain 133 has been brought to rest, the hour print wheel is backed up an additional step. Should this operation of the Geneva gear 238 occur while the hour sensor chain 133 is in motion, the print wheel will be backed up two steps while the hour sensor chain is moving one step, one of these back-up steps being caused by the movement of the chain and the other by the reverse movement of the hour differential cage.

Assume, for example, that a card was punched in at 1:15, and that fifty-seven minutes later the card was punched out, the clock then reading 2:12. Thus during the working period the clock has moved from 1:00 to 2:00, and with this movement disks 214 have rotated gear 238 to advance hour elapsed time wheel 157 one step. When the computation cycle is made, the minutes wheel will pass through a Geneva carry cycle and therefore subtract one hour from the hour print wheel 157. The card will then read 0.95 hours elapsed time.

*The electrical circuit*

As will be seen in Figs. 9 and 9A, a card entering the card chute 7 engages cam 42 and will operate lever 43 and thereby operate snap switch assembly 11. Snap switch assembly 11 consists of two independent switches **11*a* and 11*b*, and their operation from normal to closed position prepares the control circuits of the computer. Assume now that the card is being entered in the chute for the first time and that therefore, as explained in connection with Figs. 10 and 10A, lever 48 is operated to move the stop lever 49** out of the path of the card, thereby to permit the card to pass through the second zone and into the third zone of the card chute.

Figure 21:
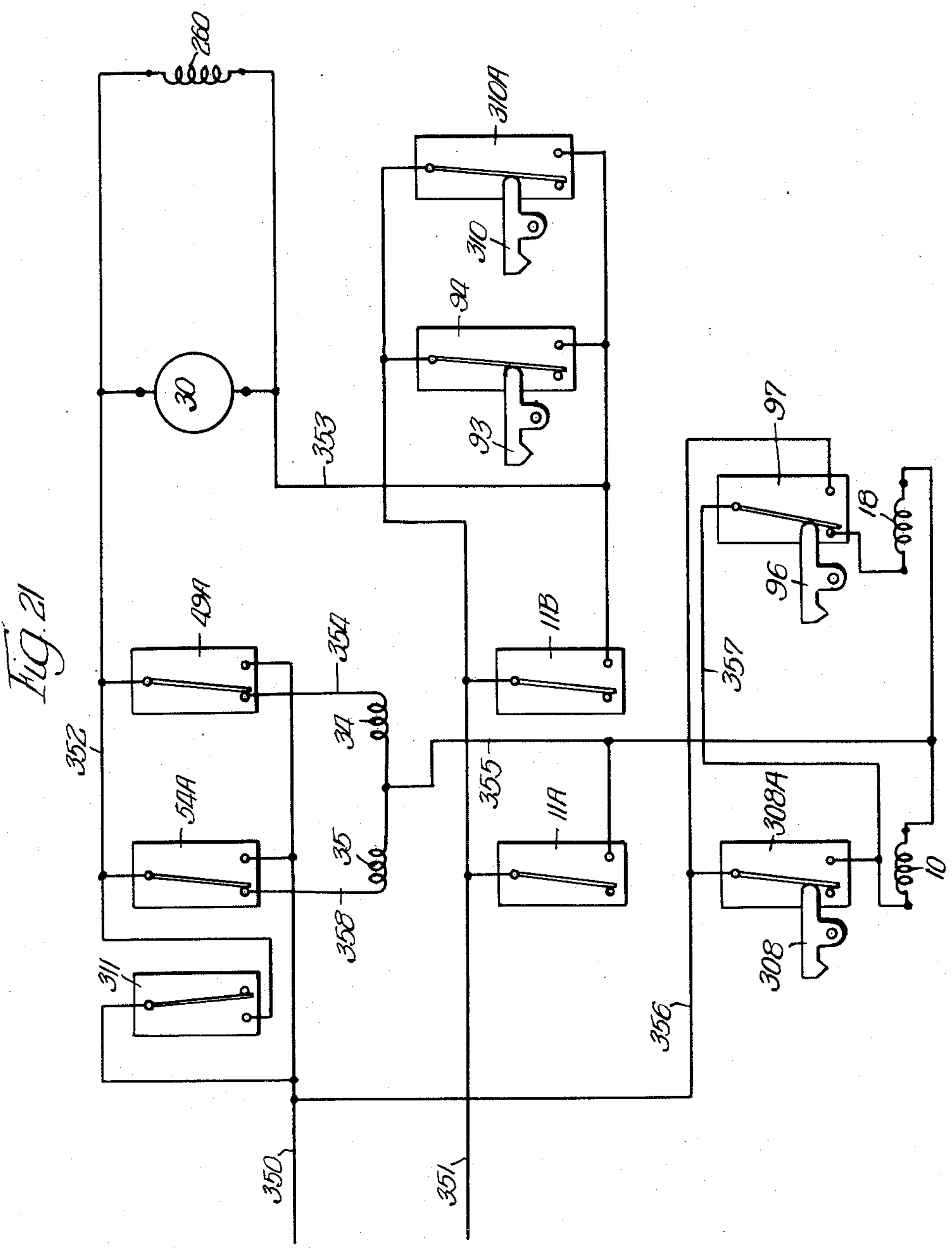
Fig. 21 is a schematic diagram of the main electrical circuits of the computer shown with the computer in its normal position.

In the third zone, the card engages operating lever **54*b* of switch 54*a*, moving that lever rearwardly of the slot thereby to operate switch 54*a*. As will be seen in Fig. 21, power is supplied to the computer through conductors 350 and 351, and a circuit may now be traced from conductor 350 through switch 54*a* and its make contact, conductor 352, and thence over parallel paths, the first leading through the motor 30, conductor 353, switch 11*b* and its make contact, to conductor 351. Simultaneously the circuit of card hold and ribbon step solenoid 260 is closed, since that solenoid is connected between conductors 352 and 353**.

A second parallel circuit extends from conductor 352 through switch **49*a* and its break contact, conductor 354, through the winding of "punch" clutch solenoid 34, conductor 355, through switch 11*a* and its make contact, to conductor 351. "Punch" clutch solenoid 34 operates the "punch" clutch, thereby to connect the power of motor 30 to the drive shaft 74** of the punch unit, operating that shaft to effect a "punch in" operation.

During the first few degrees of revolution of the shaft 74, cam 92, Fig. 11, operates lever 93, thereby to close switch 94. A substitute circuit for motor 30 that is in parallel to the circuit through switch **11*b* may now be traced from conductor 353 through switch 94 and its make contact to conductor 351, thus insuring that the circuit of motor 30 will be maintained until the shaft 74** has made a complete revolution.

When shaft 74 has rotated through approximately one-half of a revolution, cam 95, Fig. 11, operates lever 96, thereby to operate switch 97. A circuit may now be traced from conductor 350 through conductor 356, switch 97 and its make contact, conductor 357, through the winding of "time of day" print solenoid 10, conductor 355, through switch **11*a* and its make contact to conductor 351. Solenoid 10 energizes over this circuit, operating the "time of day" print hammer 9 to strike the card against the time of day print wheels and thereby impress upon the card a record of the month, day, hour and minute of punching. As previously explained in connection with Figs. 9 and 9A, operation of solenoid 10 also disconnects switches 11*a* and 11*b* from the lever 43, thereby to restore those switches to normal. Restoration of switch 11*b* is without particular effect at the moment since switch 94 is in operated position and a substitute circuit for the motor and card hold solenoid 260 is closed therethrough. The motor, therefore, continues to operate until shaft 74 has made a complete revolution, at which time lever 93 drops off of the dwell and into the valley of cam 92, opening switch 94 to disconnect the motor from the source of current. Restoration of switch 11*a* opens the previously traced circuits for the "time of day" print solenoid 10 and for "punch" clutch solenoid 34, permitting these solenoids to restore. Restoration of solenoid 34 moves stop plate 284 into the path of lug 285 preparatory to stopping further rotation of shaft 74** when that shaft has completed a full 360° of rotation.

*Punch out operation*

Insertion of a card C in the card chute 7 for a second time, thereby to effect a "punch out" operation, including computation and recording of elapsed time, operates cam 43 and switches **11*a* and 11*b* as before. Since during the "punch in" operation of the card the corner thereof was cut away, lever 48 is not engaged and stop lever 49 is engaged by the card in the manner shown in Fig. 10A. Operation of lever 49 by the card closes switch 49*a*, Fig. 3, and a circuit may now be traced from conductor 350 through switch 49*a* and its make contact, thence over the previously traced circuits through the motor 30 and card hold solenoid 260, with a parallel branch extending from the conductor 352 through switch 54*a* and its break contact, conductor 358, through the "computer" clutch solenoid 35, thence over conductor 355, through switch 11*a* and its make contact to conductor 351. Solenoid 35 operates the "computer" clutch 28 thereby to connect the power from motor 30 to the shaft 38. At the end of the first few degrees of rotation of shaft 38, cam 309 operates lever 310 thereby to operate switch 310*a*, thereby to close a substitute circuit for the motor and card solenoid by connecting conductor 351 to conductor 353 independently of switch 11*b*. Thus rotation of shaft 38** through a full revolution is assured.

Further rotation of the shaft 38 causes cam 307 to operate lever 308 and thereby close switch **308*a*. A circuit may now be traced from conductor 350 through conductor 356, through switch 308*a* and its make contact, and thence over parallel paths, the first leading through "time of day" solenoid 10, conductor 355, cutout switch 11*a* and its make contact, to conductor 351, and the second leading over conductor 357, switch 97 and its break contact, through the "elapsed time" hammer solenoid 18, and thence over conductor 355 and switch 11*a* to conductor 351. Solenoids 10 and 18** operate over this circuit thereby to strike the card against the print wheels to record on the card the month, day, hour and minute of "punch out," and also the hours and fraction of an hour of elapsed time as computed by the mechanism.

Figure 1A:
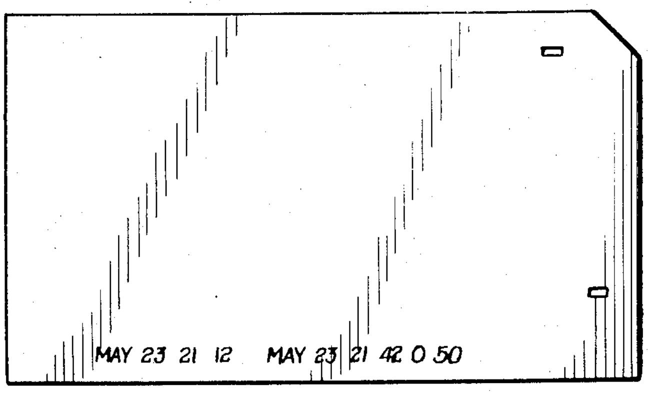
Fig. 1A is a view of a card which has been "punched in" and "punched out"

In Fig. 1A, a completed card is shown. This card was "punched in" on May 23 at 21.12, at which time the two rectangular perforations at the right end of the card were punched in it. The left one of these perforations indicates the position of the minutes punch selector and the right one the position of the hour punch selector at the moment of "punch in" and not time, as hereinbefore explained. The upper right hand corner of the card was cut away at this time. This card was "punched out" on May 23 at 21.42. The elapsed working time between 21.12 and 21.42 is thirty minutes or 0.50 hours. The elapsed time record of 0.50 is to the right of the "punch out" record and preferably is printed in a contrasting color.

Operation of solenoid 10 as above restores switches **11*a* and 11*b* as before, thereby opening the above traced circuits for solenoids 10 and 18** which restore, and also opening the circuit over which the "computer" clutch solenoid 35 was operated, permitting that solenoid to restore and thereby stop further movement of the shaft 38 when it has completed a complete revolution. The circuit of motor 30 being closed through switch 310*a* insures that the motor will continue to operate until shaft 38 has completed its single revolution, notwithstanding that switches 11*a* and 11*b* are restored.

It will be noted that both "punch in" and "punch out" cycles of the computer are initiated by the closing of switches 49*a* and 54*a*, thereby to close the circuit of the motor and card hold solenoid. In the case of "punch in," a projection of two operated punches through the card renders highly unlikely that the card could be withdrawn before the shaft 74 has been operated through a complete revolution. In the case of "punch out," there is an increased danger that a workman, being in a hurry, might withdraw the card sufficiently to restore the switch 49*a* by which the cycle of operation was initiated before the shaft 38 has completed its revolution. To guard against a contingency of this kind, a switch 311, Fig. 19, is mounted adjacent the segment 25, and a lever 311*a* by which the switch 311 is operated overhangs the segment. Movement of the segment 25 out of its normal position at the beginning of a "punch out" cycle restores switch 311 to its normal position, thereby to establish a circuit between conductor 350 and conductor 352, which circuit is independent of switches 54*a* and 49*a*. This insures that the circuit of the motor 30 will not be broken until segment 25 returns to its normal position, which it does at the completion of the 360° rotation of shaft 38. Thus, should a workman withdraw the card sufficiently to restore switch 49*a*, operation of the computer through a complete "punch out" cycle is nevertheless assured.

*Time out unit*

As will be seen in Figs. 5 and 6, a time out unit is mounted upon the rear wall of the framework of the computer. This unit consists of base plates 325, between which a shaft 326 extends. Rotatably mounted upon the shaft is a time out disk 327, shown partly in phantom in Fig. 5 to reveal devices located between the plates 325. Also rotatably mounted upon the shaft 326 is a ratchet wheel 328 that has ninety-six teeth and is fixed with respect to the disk 327.

Pivotally mounted upon the shaft 326 is a lever 329 upon which a pawl 330 is pivotally mounted and pressed into engagement with the teeth of the ratchet wheel 328 by a spring 330*a*. A second spring 331, fixed between the base plate 325 and the lever 329, urges that lever in a clockwise direction around the axis of shaft 326.

Pivotally mounted upon the base plate 325 is an operating bar 332, the upper end of which is cam shaped and engages a projection on the lever 329. The time out solenoid 333 is mounted upon the rear framework of the computer and its armature 333*a* connected to the operating bar 332. Also pivotally mounted upon the base plate 325 is a retaining pawl 334 which is spring pressed into engagement with a tooth in the ratchet wheel 328. Energization of the solenoid 333 moves its armature 333*a* to the right, as seen in Fig. 5, thereby rotating bar 332 in a counterclockwise direction around its pivot. This lowers the point of engagement of this bar with the lever 329, permitting the spring 331 to rotate the lever 329 in a clockwise direction around the axis of shaft 326. This movement disengages pawl 330 from the tooth with which it is then engaged and moves that pawl into engagement with the next succeeding tooth. As the solenoid is de-energized and its armature 333*a* moved to the left by a spring 333*b*, operating bar 332 is moved in a clockwise direction and the cam action of that bar against the lever 329 moves that lever in a counterclockwise direction around the axis of shaft 326, thereby causing the pawl 330 to rotate the ratchet wheel 328 and the disk 327 through one step. Retaining pawl 334 prevents ratchet wheel 328 from moving in a clockwise direction as the pawl 330 moves clockwise.

Disk 327 is driven through a complete revolution by ninety-six operations of the solenoid 333 and pawl 330. As will presently appear, solenoid 333 is operated once every fifteen minutes, with the result that the time out disk 327 makes one revolution every twenty-four hours.

Located around the periphery of the time out disk 327 are a plurality of tapped holes 335 which permit attachment of cams, such as 336, to the disk.

Pivotally mounted upon the base plate 325 is an operating lever 337, an arm of which engages the operating plunger of switch 338. As the disk 327 rotates in a counterclockwise direction, a cam, such as 336, is moved into engagement with the lever 337, rotating that lever around its pivot, thereby to operate the switch 338.

Through this arrangement non-working periods in the shop, such as lunch periods, rest periods, and intervals between shifts, are eliminated from the calculations of the computer. Assume, for example, that the shop has a lunch period of thirty minutes beginning at 12:00 o'clock. Cam 336 will be located so that its leading edge coincides with the 12:00 o'clock mark on the disk 327 and this cam has a width equal to two steps of the periphery of the disk. Thus, when the time out disk 327 moves into 12:00 o'clock position, lever 337 will be operated by cam 336 to operate the switch 338. When the disk is again stepped one step at 12:15, cam 336 remains in engagement with the lever to maintain the switch 338 operated. When the disk 327 takes another step at 12:30, cam 336 moves out of engagement with lever 337 and switch 338 restores to normal.

Cam 336, having a dwell spanning two steps of the disk 327, maintains the switch 338 operated for a period of thirty minutes. Cams such as 336 may be made in any number of widths of dwell, depending upon the length of time to be eliminated from elapsed time computation in fifteen minute increments. At 336*a* there is shown a cam having a dwell which maintains switch 338 operated only through a fifteen minute period.

*Time pulse stepping*

Mounted upon the back wall of the computer framework is a self-starting synchronous clock 37 which includes a gear train and a shaft 339 that makes one revolution every three minutes. Shaft 339 carries cams 340 and 340*a* that are engaged by operating levers 341 and 341*a*, respectively. Switches 342 and 342*a* are operated by levers 341 and 341*a* respectively. Cams 340 and 340*a* are so positioned on shaft 339 as to cause lever 341 to drop off the dwell slightly in advance of lever 341*a*, for a purpose presently to appear.

As will be seen in Fig. 22, clock 37 is connected across conductors 350 and 351 in series with a switch 37*a* which is maintained closed during normal operation of the computer, but which may be opened to stop the clock when desired. A push button 14*a* may be operated to connect the time of day solenoid 14 directly across conductors 350 and 351, thereby to facilitate resetting the clock after the motor 37 has been disconnected by an operation of switch 37*a*.

During the revolution of the clock shaft 339, lever 341 rides upon the dwell of cam 340, thereby operating switch 342 to move its contacts from their normally closed to their normally open position. After the shaft 339 has rotated a few degrees farther, lever 341*a* rides upon the dwell of cam 340*a*, thereby to move the switch 342*a* from its normally closed to its normally open position. After the shaft 339 has rotated to its two minutes and fifty-nine seconds position, lever 341 drops off of the dwell and into the valley of cam 340. A circuit may now be traced from conductor 350 through switch 342 and its break contact, through switch 342*a* and its make contact, through conductor 343, through the winding of the time of day solenoid 14 to conductor 351, energizing solenoid 14 preparatory to stepping the time of day minute print wheel 156 and the minute hand of the clock one step. Assuming at the moment that a working period of the shop is in progress. A parallel circuit will be extended through switch 338 and its break contact, through the winding of elapsed time solenoid 101 to conductor 351, energizing the elapsed time solenoid 101 preparatory to advancing the minutes punch selector and the minutes elapsed time print wheel one step. One second after lever 341 drops into the valley of cam 340, lever 341*a* will drop into the valley of cam 340*a* thereby opening the above traced circuits by returning switch 342*a* to its normal position. Deenergization of solenoids 14 and 101 advances their respective mechanisms one step.

As will be seen in Fig. 16, gear 186 in the clock-work mechanism makes one revolution per hour and carries four pins 344 that are spaced 90° apart. A switch 345 has an operating lever that is engaged by a pin 344 on the twelfth, twenty-seventh, forty-second and fifty-seventh minutes of the hour. This engagement of the pin 344 with the operating lever of the switch 345 closes the contacts of that switch thereby to extend conductor 343 through the winding of time cut-out solenoid 333 to conductor 351. Under these conditions the next time pulse, that is the time pulse moving the mechanism into the fifteenth, thirtieth, forty-fifth and sixtieth minute positions, will also operate time cut-out solenoid 333 to advance the time out disk 327 one step.

During non-working periods, such as lunch hours in the shop, lever 337 will be engaged with a cam such as 336, as hereinbefore explained, and switch 338 will be moved to its operated position. The circuit of the elapsed time solenoid 101 is thus opened so that the pulses received during such a time out period operate only the time of day mechanism controlled by solenoid 14 and the time out solenoid 333, as explained before, and the elapsed time mechanism remains stationary throughout the time out period.

From the foregoing, it will be apparent that the computer of the present invention, being a single chute device, first tests a card entered in the chute to determine the cycle of operation to be performed by the computer. At "punch in" the card is marked in distinctive manner to indicate that it has been "punched in," and perforations are punched in it indicating the position of the punch selectors and elapsed time print wheels at the moment of "punch in." Time of day record is printed on the card at "punch in," but there is no printing of elapsed time during this cycle.

During working periods the punch selectors and elapsed time printing wheels are stepped forwardly at regular intervals. Thus when the computer is at rest, the elapsed time print wheels are positioned to print an elapsed time value corresponding to the positions of the punch selectors.

Upon re-insertion of a "punched in" card into the card chute, a card reading device or sensor moves from a zero position forwardly to register with the perforations punched in the card to indicate the position of the computer when that card was "punched in." This forward movement of the sensor moves the elapsed time print wheels backwards, subtracting from the elapsed time value that they were in position to print at the beginning of the "punch out" cycle the number of steps that the sensor must make to reach the position of the computer at "punch in." The determination of elapsed time having thus been completed, the time of day and elapsed time are printed upon the card. It will be noted that there is no punching of the card at "punch out."

The various mechanical devices of the computer are controlled by electromagnets, which simplifies the mechanism greatly by eliminating complicated linkage systems that are required in computers controlled mechanically. This simplification renders maintenance of the computer very simple since there are no long or complicated linkage systems which must be maintained within narrow limits of adjustment to insure proper operation, as is the case in mechanically controlled computers.

While we have chosen to illustrate our invention by showing and describing a preferred embodiment of it, we have done so by way of example only, as there are many modifications and adaptation which can be made by one skilled in the art within the teachings of the invention.

Having thus complied with the statutes and shown and described a preferred embodiment of our invention, what we consider new and desire to have protected by Letters Patent is pointed out in the appended claims.

What we claim is:

1. In an elapsed time computer, a punch unit; a plurality of minutes punches in said unit uniformly spaced apart in a row; a pair of shafts, one at each end of said row, disposed at right angles to the row; a sprocket on each shaft; an endless chain threaded around said sprockets; a plurality of pins carried by said chain and spaced apart thereon so that one pin and only one pin registers at all times with a punch in said row; time controlled means for stepping said sprockets and chain to move said pin out of registration with one punch in the row and into registration with the next punch therein, thereby to select said punches for operation one at a time in sequence; means for holding said sprocket and chain fixed between successive operations of said time controlled means; and means for operating the selected punch.

2. An elapsed time computer as specified in claim 1, in which a row of hour punches is disposed parallel to the row of minutes punches; a second sprocket is rotatably disposed on each of said shafts; a second chain is threaded around said second sprockets, said second chain carrying pins one of which is at all times registered with one of the hours punches; and means for stepping said second chain one step as a minutes pin passes out of registration with the last punch in the minutes row and the following pin moves into registration with the first pin in the minutes row, thereby to move the hour punch selecting pin into registration with the next punch in the hour row to register an hour.

3. An elapsed time computer as specified in claim 2, in which the means for operating the selected punches includes a presser plate movable in a vertical plane, and presser bars on said plate that engage the punch selecting pins to simultaneously operate both selected minutes and hours punches upon each operation of the punch unit.

4. A computer as specified in claim 2, in which the punch unit includes a punch for marking a card in a distinctive manner through which marking the computer is controlled to prevent the card from being returned into registration with the punch unit when next the card is inserted into the computer.

5. In an elapsed time computer, a punch unit comprising two rows of punches, each containing a plurality of punches; a punch selector for each row of punches; a shaft to which one of said punch selectors is operatively connected; electromagnetic means for stepping said shaft to move said connected punch selector to select the punches in the associated row one at a time in sequence; Geneva gears for stepping the other row punch selector one step for each predetermind number of steps of the first selector, thereby to select the punches in the second row one at a time in sequence; a print wheel for printing minutes of elapsed time; a gear train including a differential gear for connecting said print wheel to said shaft, thereby to advance the print wheel one step each time the first punch selector is stepped; a print wheel for printing hours of elapsed time; and a Geneva gear connecting the hours print wheel through a gear train to the minutes print wheel, thereby to step the hours print wheel one step for each predetermined number of steps of the minutes print wheel.

6. An elapsed time computer as specified in claim 5, in which means operating through said first differential gear steps the print wheel backwards while the punch selector remains stationary and in which the gear train between the minutes print wheel and the hours print wheel includes a second differential gear, and in which means operating through the latter differential gear steps the hours print wheel backwardly independently of the Geneva gear by which the wheel is driven forwardly.

7. An elapsed time computer as specified in claim 6, in which the means for driving the minutes print wheel backwardly is controlled by a sensing unit simultaneously driven over a card and into registration with a perforation previously punched therein to indicate the positions of the punch selector and minutes print wheel at the time of the first insertion of the card in the computer and in which the means for driving the hours print wheel backwardly independently of the Geneva gear is controlled by a sensing unit simultaneously driven over the card and into registration with a perforation previously punched in the card to indicate the hours position of the computer at said first insertion time, and in which the backward movements of the print wheels cease when the associated sensing unit registers with the corresponding perforation in the card.

8. In an elapsed time computer, a card chute extending rearwardly from a front face of the computer; a punch unit located at the rear end of said chute, said unit comprising: a row of fractional hour punches extending transversely across the chute; an endless chain encircling a pair of spaced apart sprocket wheels and disposed above said row of punches; spaced apart pins projecting out of said chain, one of which is at all times registered with one of the punches in said row; time controlled electromagnetic means for moving said chain to move said pin into registration with the adjacent punch in said row; a row of hour punches adjacent the row of minute punches; a second chain threaded around spaced apart sprocket wheels and disposed above said row of hour punches; pins projecting out of said second chain, one of which pins is registered at all times with one of the hour punches; Geneva gear means connecting together said chain sprockets and operable to move said second chain one step after the first chain has moved a predetermined number of steps thereby to step the pin on the second chain into registration with the adjacent hour punch; an identifying punch in said unit; and means for operating said pins downwardly to operate the two punches with which they are registered and to simultaneously operate said identifying punch thereby to punch in data in a card in the chute.

9. An elapsed time computer as specified in claim 8, in which there are twenty minute punches and twelve hour punches, and in which the electromagnetic means is operated at three minute intervals and in which the Geneva gears step the hour change one step for each twenty steps of the minutes chain.

10. An elapsed time computer as specified in claim 8, in which the punch unit includes a bottom die plate that forms the bottom of a portion of the chute, and a top die plate spaced above the bottom die plate sufficiently to permit entry of a card therebetween, and in which the punches are supported in part by the top die plate.

11. An elapsed time computer as specified in claim 8, in which there is an electric motor for driving the computer and the means for operating the punches includes presser bars registered with the pins and identifying punch, and moved downwardly by a cam fixed upon a shaft that is driven through a single revolution by the motor.

12. An elapsed time computer as specified in claim 8, in which an electric switch operated by a card moving into "punch in" position in the chute closes the circuit of the motor to operate it and in which a cam on the shaft operates another electric switch to maintain the motor circuit closed throughout the single revolution of the shaft.

13. An elapsed time computer as specified in claim 8, in which each punch contains a notch indented into one of its sides and in which stripper bars carried on said operating means project into the notches to support the punches in normal position and to return operated punches to normal during upward movement of the operating means as the shaft completes its single revolution.

14. An elapsed time computer as specified in claim 8, in which the electric motor is connected to the shaft by a single revolution clutch and in which an electromagnet controls that clutch and a circuit for said magnet is closed by the card operated switch in parallel with said motor.

15. In an elapsed time computer: an elapsed time print wheel; means comprising a gear train that includes a differential gear for advancing said print wheel step by step at regulatr intervals; a card reading sensor; drive means for advancing said sensor forwardly from a zero position through a predetermined number of steps; means including said differential gear for connecting said drive means to said print wheel over which means operation of the drive means to advance the sensor backs up the print wheel a number of steps equalling the number of forward steps through which the sensor is driven.

16. An elapsed time computer as specified in claim 15, in which the drive means includes a pinion and in which a segment, that is meshed with that pinion, is driven, first in one direction, to actuate the drive means to advance the sensor and to back up the print wheel, and second in a reverse direction, to back up the sensor and to advance the print wheel thereby to return the sensor and print wheel to the positions which they occupied at the start of the first movement of the segment.

17. In an elasped time computer: a shaft; means for advancing said shaft step by step at regular spaced intervals; a differential unit, including a cage, a gear train connecting said shaft to said cage over which the cage is advanced a step each time the shaft is advanced a step; pairs of intermeshed differential pinions carried by said cage; a first gear meshed with a pinion in each of said pairs and extending out of said cage and rotatable with respect to the cage; a second gear in said unit fixed with respect to and rotatable with said first gear; a print wheel; a gear train connecting said print wheel to said second gear over which the print wheel is advanced one step each time the cage is advanced one step; a third gear in said unit meshed with said other pinions in said pairs of differential pinions and rotatable with respect to said cage; a card reading sensor; means including a drive gear fixed with respect to and rotatable with said third gear for driving said sensor forwardly from a zero position through a predetermined number of steps; a segment pinion fixed with respect to and rotatable with said third and drive gears; a segment meshed with said segment pinion; and means for driving said segment thereby to rotate said segment pinion to advance said sensor, rotation of said segment pinion rotating said third gear and through it the differential pinions, the first and second gears, and the print wheel gear train to move the print wheel backwards a number of steps equalling the number of forward steps through which the sensor is driven.

18. In an elapsed time computer, a computer drive shaft; an electric motor; means including a single revolution clutch for connecting said motor to said shaft to drive the shaft through a single revolution; a disk fixed upon said shaft; a pin carried on said disk; a segment shaft; means including a pivoted lever driven around its pivot by said pin for rotating said segment shaft in one direction during the first half of the single revolution of said drive shaft and in the opposite direction during the last half of said single revolution; a pair of segments on said segment shaft; a pair of differential gear assemblies one for each segment with a pinion in which the segment is meshed; a pair of card sensors one for each differential driven forwardly by the segment during the movement of the segment shaft in said one direction and moved backwardly by the movement of said shaft in said opposite direction; and a pair of elapsed time print wheels one for each differential driven backwardly by the segment through the differential during the movement of said segment shaft in said one direction and driven forwardly thereby during the movement of said segment shaft in said opposite direction.

19. An elapsed time computer as specified in claim 18, in which a clutch connects each segment to the segment shaft, which clutch releases when the sensor driven by that segment is brought to rest by engagement with a perforation in a card thereby to permit further movement of the segment shaft.

20. An elapsed time computer as specified in claim 19, in which there is an off normal switch the operating lever of which is engaged by one of the segments in normal position to maintain the switch in open circuit position, movement of the segment out of normal position moving said switch to closed circuit position thereby to close an auxiliary circuit for the motor over which circuit the motor operates until the segment returns to normal.

21. In an elapsed time computer: a solenoid; a circuit for said solenoid over which the solenoid is energized periodically; a normally closed switch in said circuit; an operating lever for said switch; a time out disk; means for stepping said disk at regular intervals; removable cam means fixed on said disk at predetermined points thereon and projecting radially outwardly therefrom, said cam means being moved into engagement with said operating lever at predetermined variable times thereby to move the switch to open circuit position to prevent energization of the solenoid during a predetermined interval until the cam means is moved out of engagement with said operating lever.

22. In an elapsed time computer; a chute into which cards may be entered; a time of day print solenoid having an armature; a crank pivotally mounted near said solenoid and having an arm disposed in the path of said armature; a bar pivotally mounted upon another arm of said crank; switch means having an operating lever engaged by said bar; a lever pivotally mounted and extending into said chute; and an arm on said lever engaging said bar, said lever being engaged by and rotated on its pivot by a card entering said chute thereby causing its arm to rotate said bar and operate said switch means to condition the computer for a cycle of operation; energization of said solenoid moving said armature and rotating said crank to raise said bar thereby to permit said switch means to restore, the arm of said card engaged lever holding said bar elevated so long as the card remains in the chute to prevent reoperation of the computer prior to withdrawal of that card from the chute.

23. In an elapsed time computer, a card chute having a bottom plate upon which a card may rest and guides rising from the edges of said plate; a shaft positioned beneath said plate and journaled for rotation about its axis, a bell crank bracket fixed upon said shaft, a stop lever pivotally mounted upon said bracket and extending upwardly therefrom, there being a perforation in said plate through which said stop lever projects into the chute; and a control lever fixed upon said shaft, there being a perforation in said plate adjacent one of said guides through which said control lever projects into said chute, the leading edge of a card inserted in said chute for a first time engaging said control lever and rotating it and said shaft thereby to move the control lever out of the chute and to move the pivotal connection between said stop lever and bracket downwardly to withdraw the stop lever from the chute thereby to permit the card to move past the position normally occupied by the stop lever.

24. In an elapsed time computer as specified in claim 23, a second stop in said chute located rearwardly of said stop lever, a second control lever adjacent said second stop, and means operated in response to an operation of said second control lever by a card for cutting away the corner of that card adjacent said one guide whereby upon re-entry of that card in the chute the leading edge of that card engages said stop lever before said first control lever is engaged and inward movement of the card in the chute is thereby stopped.

References Cited in the file of this patent

UNITED STATES PATENTS

| | | |
|---|---|---|
| 623,473 | Hill | Apr. 18, 1899 |
| 653,711 | Thrasher | July 17, 1900 |
| 1,260,705 | Pierce | Mar. 26, 1918 |
| 1,743,175 | Wensley et al. | Jan. 14, 1930 |
| 1,780,770 | Salustri et al. | Nov. 4, 1930 |
| 2,415,854 | Sheffield | Feb. 18, 1947 |
| 2,421,697 | Hobby | June 3, 1947 |
| 2,591,448 | Lorenz | Apr. 1, 1952 |
| 2,755,995 | Black | July 24, 1956 |
| 2,765,022 | Bergerin | Oct. 2, 1956 |
| 2,810,621 | Hibbard | Oct. 22, 1957 |